United States Patent
Allen et al.

(10) Patent No.: US 7,979,667 B2
(45) Date of Patent: Jul. 12, 2011

(54) MEMORY ARRAY SEARCH ENGINE

(75) Inventors: Walter Allen, Wellington, CO (US);
Robert France, Austin, TX (US)

(73) Assignee: Spansion LLC, Sunnyvale, CA (US)

( * ) Notice: Subject to any disclaimer, the term of this patent is extended or adjusted under 35 U.S.C. 154(b) by 784 days.

(21) Appl. No.: 11/953,501

(22) Filed: Dec. 10, 2007

(65) Prior Publication Data
US 2009/0150646 A1 Jun. 11, 2009

(51) Int. Cl.
*G06F 12/10* (2006.01)
(52) U.S. Cl. .......... 711/203; 711/154; 711/E12.059
(58) Field of Classification Search .......... None
See application file for complete search history.

(56) References Cited

U.S. PATENT DOCUMENTS

| | | | | |
|---|---|---|---|---|
| 5,383,146 A | * | 1/1995 | Threewitt | 711/104 |
| 5,485,595 A | * | 1/1996 | Assar et al. | 711/103 |
| 6,000,006 A | * | 12/1999 | Bruce et al. | 711/103 |
| 6,041,393 A | * | 3/2000 | Hsu | 711/157 |
| 7,133,302 B1 | * | 11/2006 | Srinivasan et al. | 365/49.1 |
| 7,568,068 B2 | * | 7/2009 | Kulkarni et al. | 711/113 |
| 2004/0078368 A1 | * | 4/2004 | Excoffier et al. | 707/4 |
| 2005/0010717 A1 | * | 1/2005 | Ng et al. | 711/103 |
| 2007/0168625 A1 | * | 7/2007 | Cornwell et al. | 711/157 |

* cited by examiner

*Primary Examiner* — Michael C Krofcheck
(74) *Attorney, Agent, or Firm* — Turocy & Watson, LLP

(57) ABSTRACT

Systems and/or methods that facilitate a search of a memory component(s) to locate a desired logical block address (LBA) associated with a memory location in a memory component are presented. Searches to locate a desired LBA(s) in a memory component(s) associated with a processor component are offloaded and controlled by the memory component (s). A search component searches pages in the memory array to facilitate locating a page of data associated with an LBA stored in the memory component. The search component can retrieve a portion of a page of data in a block in the memory component to facilitate determining whether the page contains an LBA associated with a command based in part on command information. The search component can search pages in the memory component until a desired page is located or a predetermined number of searches is performed without locating the desired page.

19 Claims, 11 Drawing Sheets

MEMORY ARRAY SEARCH ENGINE

TECHNICAL FIELD

The subject innovation relates generally to memory systems and in particular to systems and methods for searching for information in memory devices.

BACKGROUND

A wide variety of memory devices can be used to maintain and store data and instructions for various computers and similar systems. In particular, flash memory is a type of electronic memory media that can be rewritten and that can retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash memory and/or NAND flash memory, for example. NOR flash memory evolved from electrically erasable read only memory (EEPROM) chip technology, in which, unlike flash memory, a single byte can be erased; and NAND flash memory evolved from DRAM technology. Flash memory devices typically are less expensive and denser as compared to many other memory devices, meaning that flash memory devices can store more data per unit area.

Flash memory has become popular, at least in part, because it combines the advantages of the high density and low cost of EPROM with the electrical erasability of EEPROM. Flash memory is nonvolatile; it can be rewritten and can hold its content without power. It can be used in many portable electronic products, such as cell phones, portable computers, voice recorders, thumbnail drives and the like, as well as in many larger electronic systems, such as cars, planes, industrial control systems, etc. The fact that flash memory can be rewritten, as well as its retention of data without a power source, small size, and light weight, have all combined to make flash memory devices useful and popular means for transporting and maintaining data.

Typically, when data is stored in a physical location (e.g. physical block address (PBA)) in a memory device, a logical block address (LBA) can be associated with the data to facilitate retrieval of the data from the memory by a host. An address translation table can be used to store the translations of LBAs to the PBAs. When the host requests data from or desires to write data to a particular LBA, the address translation table can be accessed to determine the PBA that is associated with the LBA. The LBA associated with the data can remain the same even if the PBA where the data is stored changes. For example, a block of memory containing the PBA can have antiquated data in other memory locations in the block. The block of memory can be erased to reclaim the block, and valid data stored in the block, including the data in the PBA, can be moved to new physical locations in the memory. While the PBA of the data is changed, the LBA can remain the same. The address translation table can be updated to associate the new PBA with the LBA.

Conventionally, when a host processor desires to access a memory location the host processor can send a command to the memory that specifies the LBA the host processor wants to access. The LBA can be associated with a PBA, where the PBA can be in a block of memory that can contain a plurality of pages, for example, 512 pages. The memory can receive the command and can load a page into a buffer, which can take multiple load operations to load the entire page, and the buffer can be indexed into a desired location and then offloaded to a register in the host processor for comparison to a data pattern to confirm whether the data pattern associated with the LBA of the retrieved page is the desired LBA. Given 512 pages in a block, for example, there can be an average of 256 pages that are offloaded to the host processor in order to locate the desired LBA.

It is desirable to be able search for an LBA within a page in a memory array of a memory component such that the amount of information searched in a particular page can be reduced to facilitate reducing the amount of time to perform the search. Is it also desirable to reduce the amount of communication and/or information transmitted between a host processor and the memory during a search for an LBA in a memory, as the less time the host processor spends communicating with and/or transmitting/receiving information to/from the memory, the more time the host processor can have to perform other functions and/or the less time that is utilized to perform the search for the desired LBA. Further, where there are multiple memory components (e.g., memory devices), it is desirable to be able to perform searches for a desired LBAs contained in respective memory components in an efficient manner to facilitate reducing the amount of time to perform such searches.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods that facilitate searching data (e.g., a page of data) associated with logical block address (LBA) information in a memory component (e.g. flash memory). In accordance with one aspect of the disclosed subject matter, a search component can be employed to facilitate searching a memory array in a memory component for a desired LBA that can be contained in a page of the memory array. The memory array can comprise a predetermined number of blocks in which a plurality of memory locations (e.g. memory cells) can be respectively located in each block. In each block, there can be a predetermined number of pages that can contain memory locations (e.g., memory cells) in which data can be stored, wherein a page can contain regions to store data (e.g., user data) and metadata, which can facilitate identifying and/or retrieving the data.

In accordance with an aspect, a processor component can offload a search for a desired LBA (e.g., LBA search) and an associated page of data to the memory component, which can control the search and locate the desired LBA and associated page of data, and can thereby leave the processor component unencumbered with regard to the search to facilitate enabling the processor component to remain unencumbered so that it can perform other functions and/or operations, instead of managing the LBA search.

In accordance with one aspect, the processor component can provide a command that can specify an desired LBA, and/or can include information related to a memory component (e.g., specifying a particular memory component), a block (e.g., block offset, block number), a page (e.g., page offset), a region of data (e.g., page area offset in a page), search up/search down information, search termination information, and/or other information, to facilitate locating the desired LBA and loading the page of data associated therewith. In another aspect, the command information can include information (e.g., page area offset) to facilitate retrieval of a portion (e.g. spare area) of a page of data that can contain metadata (e.g., a data pattern) that can be associated with the memory location, which can be associated with the LBA. Such command information can facilitate retrieval of data (e.g. data pattern) relevant to the LBA search, as opposed to retrieving and loading an entire page of data, which can contain a significant amount of data that is unnecessary to load in order to perform the LBA search. As a result, the LBA search can be focused to retrieve and/or load a desired subset of data, which can comprise a data pattern, from a page, where such data pattern can be utilized to compare against a data pattern provided with the command in order to facilitate locating the desired LBA.

In accordance with another aspect of the disclosed subject matter, a controller component in the memory component can facilitate controlling the LBA search, and can operate in conjunction with the search component to perform the LBA search and/or page loading of the associated page of data. When the desired LBA is identified and/or located, the controller component can facilitate retrieving the page associated with the LBA and loading the page into a buffer component. In one aspect, the page can be provided to the processor component and/or the processor component can facilitate performing operations (e.g., write, read, erase) of the memory location associated with the LBA.

In accordance with an aspect, a search can comprise a search of the entire memory component. In another aspect, a search (e.g., LBA search) can be focused to begin the search at a particular block based in part on command information, which can specify a particular block in which to start the search based in part on information indicating that the desired LBA is in a particular block and/or information indicating that the desired LBA can be contained within a subset of the blocks of the memory component (e.g., where only certain blocks have been utilized).

In accordance with yet another aspect of the disclosed subject matter, multiple memory components can be associated with the processor component. In one aspect, LBA searches of respective memory components can be interleaved and/or performed in parallel to facilitate efficient searching of the respective memory components for desired LBAs and/or improved system speed. For example, a processor component can issue commands to each of a predetermined number of memory components associated therewith, and each memory component can employ a respective controller component and respective search component to facilitate searching its respective memory array to locate a desired LBA and associated page of data based in part on respective command information. When a search is completed by a particular memory component, such memory component can provide a "ready" signal to the processor component indicating that the search is complete, and the page of data associated with the LBA search can be provided to the processor component, for example, at a time when the processor component is available to communicate with the particular memory component.

In accordance with still another aspect, methods that can facilitate searching for information (e.g., LBA and associated data) in a memory component are presented. In another aspect, electronic devices that can comprise a memory component that can facilitate searching for information, in accordance with the disclosed subject matter, and/or a system that can facilitate searching for information in a memory component are presented.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
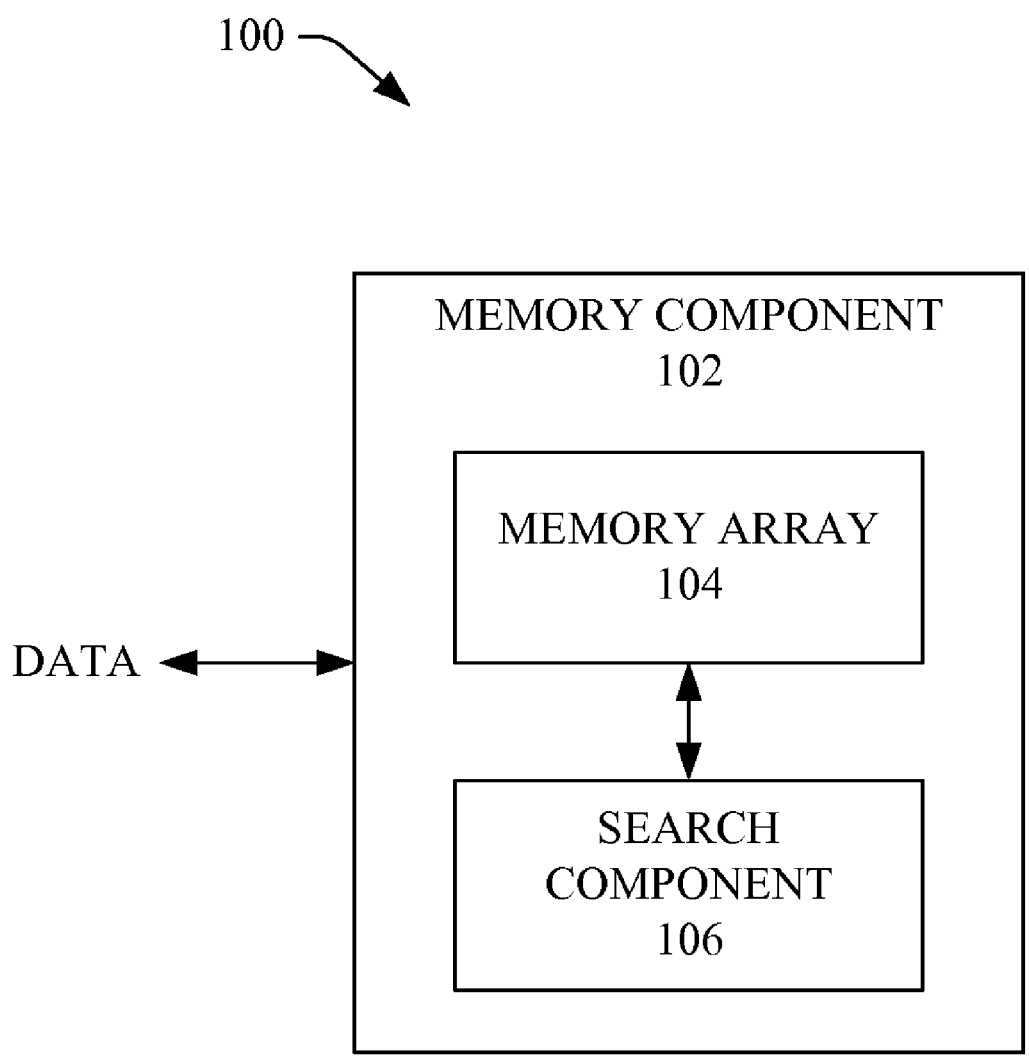
FIG. 1 illustrates a block diagram of a system that can facilitate access of information associated with a memory component in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Conventionally, when searching for a logical block address (LBA) in a memory (e.g., flash memory), an entire page of data is retrieved and loaded into a buffer, the data is manipulated in the buffer based on offset information associated with the command, and the data is provided to a processor component, which compares a data pattern in the page to a data pattern that is associated with the desired LBA. If the data patterns do not match each other, subsequent pages are retrieved, loaded, offset, and provided to the processor component until the desired LBA is located and associated page provided to the processor component, or until the search is terminated. Thus, the processor component manages the LBA search and devotes time to performing the LBA search and, as a result, the processor component is unavailable to perform other functions while it manages the LBA search.

Systems and/or methods are presented that can facilitate searching for data associated with a logical block address in a memory component (e.g. flash memory). The subject innovation can offload the LBA search to the memory component (s), which can thereby facilitate relieving the processor component of the duties of managing the search for the desired LBA in the memory component(s). The memory component can comprise a controller component that can facilitate control of the LBA searches. The controller component can receive a command from the processor component that can contain information (e.g., offset information, data pattern) that can facilitate focusing and/or performing the search within the memory component. A search component can be employed to perform LBA searches, where the search component can retrieve metadata (e.g., data pattern) associated with an LBA, and can manipulate the metadata so that it is in a proper form to be compared with the data pattern associated with the desired LBA and included in the command. The search component can compare the respective data patterns, and if they match, the desired LBA is located, and the page associated with the desired LBA can be retrieved from the memory array and loaded into a buffer component, where the page of data can be provided to the processor component. Multiple memory components can be communicatively connected to the processor component and LBA searches can be interleaved so that respective searches can be performed simultaneously or substantially simultaneously by each memory component.

Figure 6:
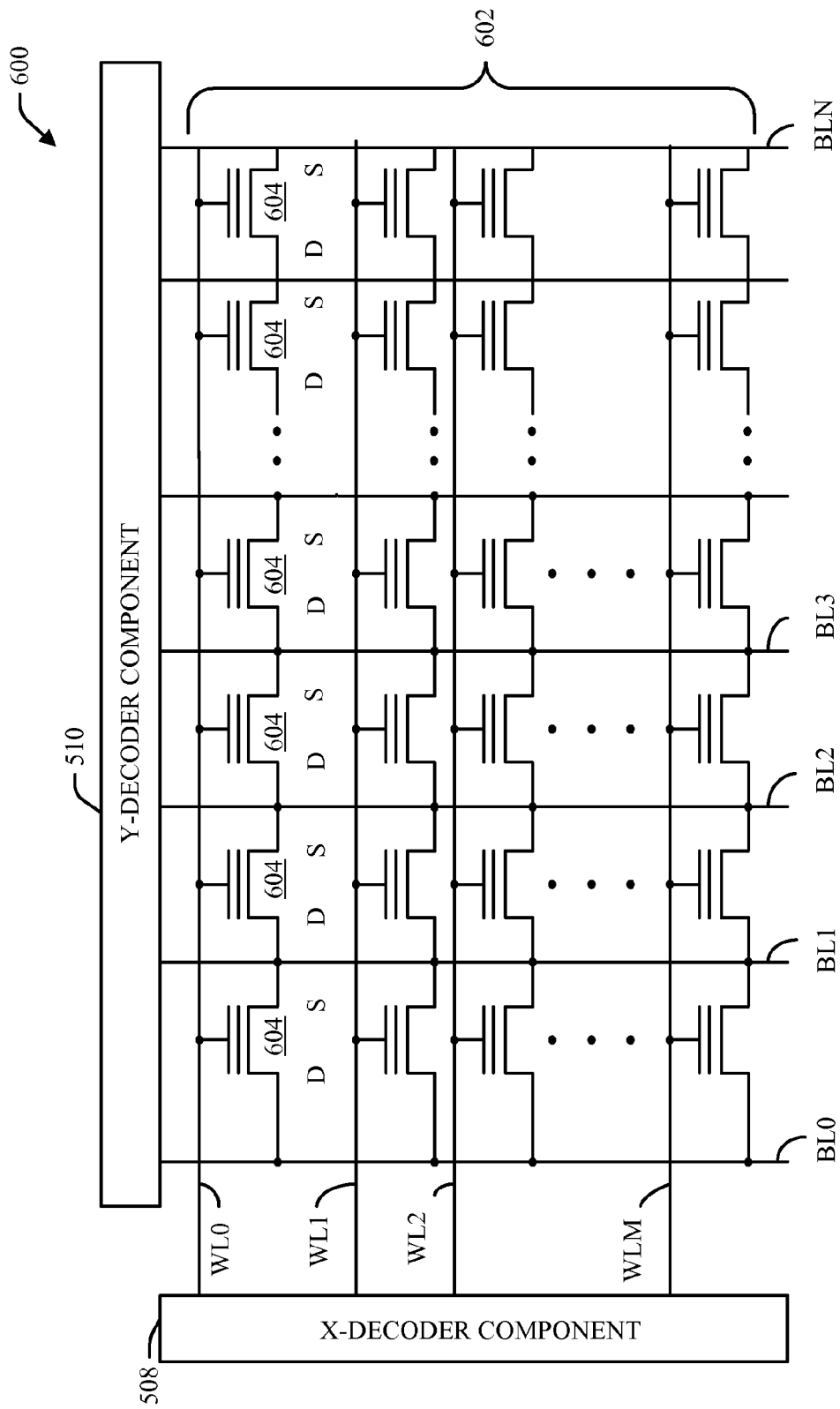
FIG. 6 illustrates a diagram of a portion of a memory array that can facilitate data storage in accordance with an aspect of the disclosed subject matter.

Turning to the figures, FIG. 1 illustrates a system 100 that can facilitate a search for a memory location in a memory in accordance with an aspect of the disclosed subject matter. System 100 can include a memory component 102 that can be comprised of a non-volatile memory (e.g. flash memory) and/or volatile memory (e.g., random access memory (RAM)). The memory component 102 can receive information, including data, commands, and/or other information, which the memory component 102 can process (e.g. store data, execute commands, etc.). The memory component 102 can include a memory array 104 that can receive and store data. The memory array 104 can include a plurality of memory cells (not shown in FIG. 1; as depicted in FIG. 6) wherein each memory cell can store one or more bits of data. Data stored in a memory cell(s) in the memory array 104 can be read and such data can be provided as an output, or can be erased from the memory cell(s).

Conventionally, when data is desired from a memory (e.g., flash memory), a host processor can issue a command to the memory, where the memory command can include information regarding the particular memory device and a particular block, where the data can be stored on a page within the block. The memory can load a page from that block in to a buffer (e.g., page buffer), where typically there can be multiple loads in order to load the entire page. The data in the buffer can be offset to a region of the page that contains a data pattern, and provided to a register in the host processor, which can compare the provided data pattern to a data pattern associated with the desired LBA to determine whether the provided data pattern is a match to the data pattern of the LBA. If there is a match, the search can stop; if the respective data patterns do not match, the process can continue until a match is found, or until a predetermined number of iterations are performed without a match being located. Thus, traditionally, entire pages of data are loaded and transmitted to the host processor, and the host processor manages the search until the desired LBA and/or data are located, or until the search is otherwise stopped.

Figure 3:
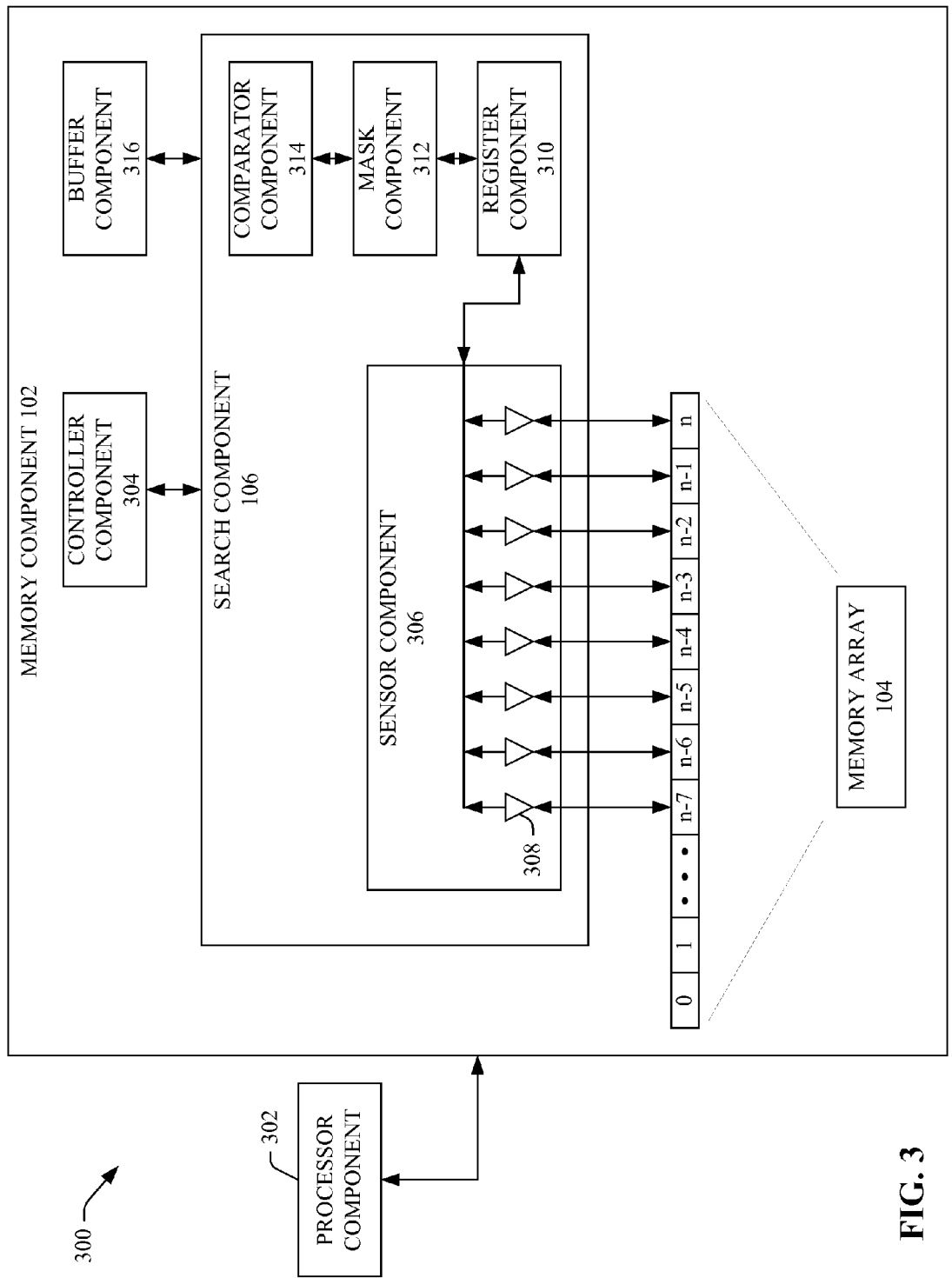
FIG. 3 is a block diagram depicting a system that can facilitate access of information associated with a memory component in accordance with an aspect of the subject matter disclosed herein.

In accordance with an aspect of the disclosed subject matter, the search for a desired LBA in a memory component 102 (e.g., flash memory) can be offloaded to the memory component 102, and the memory component 102 can control the search for the desired LBA (and/or associated memory location and/or data associated therewith) and can compare the data pattern associated with the command to the data pattern associated with a portion of a page of data stored in the memory array 104. In accordance with another aspect, instead of loading an entire page, where only a portion of the page is utilized to compare to the data pattern associated with the command, the memory component 102 can facilitate retrieving and loading only the portion of the page that contains the metadata (e.g., data pattern) to be compared to the data pattern associated with the received command. When a desired LBA is located (e.g., when the data pattern associated with the portion of the page is a match to the data pattern associated with the command), the memory component 102 can load the page wherein the LBA is located into a buffer component (e.g., as depicted in FIG. 3 and described herein) and can indicate to a processor component (e.g., host processor) (not shown) that the desired LBA has been located. In another aspect, there can be a predetermined number of searches for a particular LBA, and if the predetermined number of searches is reached without locating the particular LBA, the search can be terminated, and the memory component 102 can provide information indicating that the search is terminated.

As a result, communication and the amount of data transmitted between the memory component 102 and a processor component can be significantly reduced as the processor component is not involved in the search for the desired LBA after the command is provided to the memory component 102, and thus, the pages of data are not provided to the processor component for comparison with the data pattern. As further result, the search for the desired LBA by the memory component 102 can be optimized such that only the portion of the page that contains the data pattern is retrieved and loaded, so that it can be compared to the data pattern associated with the command, as opposed to retrieving and loading the entire page to perform the data pattern comparison.

In accordance with an aspect of the disclosed subject matter, the memory component 102 can include a search component 106 that can facilitate searching for a desired LBA and associated memory location (e.g. PBA) located in the memory component 102. The search component 106 can facilitate searching for a desired LBA, which can be associated with a page of data, by comparing only that portion of a page that contains metadata, where the metadata can comprise a data pattern, for example, and can be compared to a data pattern associated with the desired LBA that can be provided with the command in order to determine whether the searched page contains the LBA desired by the command and thus contains the desired memory location.

The memory component 102 can receive a command, where the command can include information, such as an LBA associated with the desired memory location(s), a block location in the memory array 104 in which a desired memory location resides and/or a block offset to facilitate determining in which block the desired LBA and/or associated memory location resides, metadata information (e.g., data pattern) that can facilitate identifying the desired LBA, an area offset (or page area offset) that can specify which area of a page to examine and/or evaluate to facilitate determining whether such page contains the desired LBA, a page offset to facilitate determining at which page in a block to begin searching, search procedure information (e.g., search up from start point, search down from start point), search termination information, and/or other command information.

Figure 2:
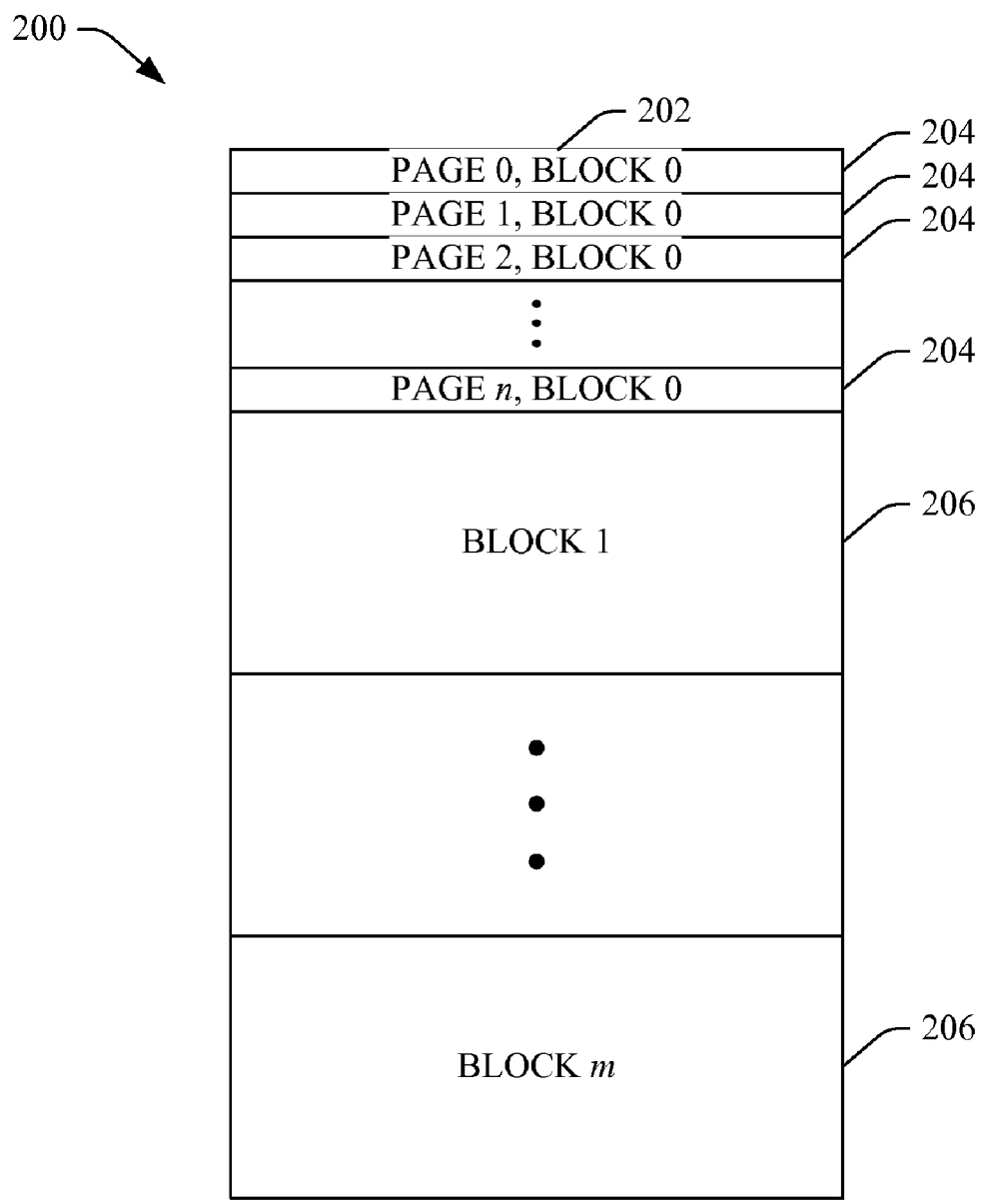
FIG. 2 depicts an example of a block diagram of a portion of a memory component in accordance with an aspect of the disclosed subject matter.

In one aspect, the memory array 104 can be comprised of a predetermined number of blocks (e.g. also referred to herein as erase blocks or e-blocks) (as illustrated in FIG. 2 herein, and additionally described herein in relation to FIG. 2), where a block can be the minimum portion of the memory component 102 (e.g. flash memory) that can be erased during an erase operation. There can be certain blocks in the memory component 102 where it can be known that there is no valid data therein and/or that such blocks are unused. The block offset can facilitate identifying at which block to begin searching for the desired LBA to facilitate focusing the search to blocks in the memory array 104 that can potentially contain the desired LBA. For instance, if there are 2048 blocks (e.g. $block_0$ through $block_{2047}$) in a memory component 102, but only $block_0$ through $block_{140}$ have been utilized, it can be known that the desired LBA is not in $block_{141}$ through $block_{2047}$, and the block offset can specify to begin the search at $block_{140}$, where the search can proceed down (e.g., search down) through the blocks until the desired page is located. In another aspect, the command information can include a specified block in the memory array 104 in which the page of data can be stored, and the search can begin at the specified block, as provided in the command.

In still another aspect, the command information can include a page offset to specify at which page in a block to begin searching. For example, each block can have a predetermined number of pages. If, for instance, a block has 512 pages, it can be known whether all pages in that block have been accessed (e.g., written) and/or have valid data, or if there are pages in the block that have not been utilized (or at least not utilized since the block was last erased). The page offset can specify at which page in the block to begin searching based in part on the usage of the block (e.g., portion of the block that is currently being utilized).

In still another aspect, the command information can include an area offset (also referred to herein as page area offset), where the area offset can specify an amount of area (e.g., number of bits) in which the search is to be offset within the page of data being evaluated. A page can be comprised of data areas (e.g., data regions) and spare areas (e.g., spare regions), wherein the data areas can store data being written to the page and the spare areas can be utilized to store metadata (e.g., data pattern) associated with the memory location and/or data stored in the memory location that can be used, for example, to facilitate identifying the data and/or the memory location to facilitate accessing the data and/or the memory location associated with the memory component 102. The location of the spare areas can be predefined and the command can specify an area offset so that the search can be focused on the spare area in the page where the metadata can be stored.

Based in part on the command information, the search component 106 can facilitate searching the memory component 102 to locate the desired LBA and/or associated memory location and/or associated data. In one aspect, the search component 106 can facilitate starting a search of a portion of a page in a block in a memory array 104 based in part on block information (e.g., block offset, specified block), page offset, and/or page area offset, which can be included in a command, to locate a desired LBA specified in the command. The search component 106 can sense or detect the data values (e.g., bit value, symbol value) of the portion of the page based in part on the page area offset and can load the sensed or detected data into a register component (e.g., as depicted in FIG. 3) associated with search component 106. The data can be metadata (e.g., data pattern) associated with the LBA and/or memory location in the page, which can be utilized to determine whether the LBA is the correct LBA based on the command. In another aspect, the search component 106 can facilitate shifting or rotating the data in the register component based in part on the offset specified in the command so that the data can be in the proper order in the register component to facilitate comparing the data to the data pattern provided with the command. In still another aspect, if there are non-determinate bits (or symbols) in the register component, such as, for example, if there are more bits retrieved and loaded in the register than are required for the comparison, the search component 106 can facilitate masking the data to place the non-determinate bits to a known value (e.g., 0) so that the determinate bits of the retrieved data can be compared to the data pattern associated with the command.

In yet another aspect, the search component 106 can facilitate comparing the retrieved data pattern (e.g., which can be the retrieve data, as shifted, rotated, and/or masked) to the data pattern associated with the command. If there is a match, the search can be complete, as the desired LBA is located, and the memory component 102 can retrieve the entire page containing located LBA and load the page into the buffer component, and can indicate (e.g., to a processor component, as illustrated in FIG. 3 and described herein) that the desired LBA and associated memory location is located. If the retrieved data pattern does not match the data pattern associated with the command, the search component 106 can continue the search by proceeding to the next page in the block and retrieving the data pattern contained in the portion of the page based in part on the offset, and can compare such data pattern to determine whether there is a match, and so on, until either the desired LBA is located or until a predetermined number of pages have been searched without the desired LBA being located. If a predetermined number of pages have been searched without the desired LBA being located, the memory component 102 can provide information indicating the desired LBA is not located.

The subject innovation, by offloading the searches (e.g., LBA searches) to the memory component 102 can facilitate improving system performance. A processor component (e.g., processor component 302, as depicted in FIG. 3, and described herein) can remain unencumbered, as the searches can be performed by the search component 106 in the memory component 102, and, as a result, the processor component is free to perform other functions, thereby improving overall system performance. Further, the searches can be focused so that only the region of the page that is of interest (e.g. the spare area of the page that contains the data pattern) can be retrieved, as compared to conventional searches, where the entire page was retrieved and offset before being provided to the processor component for comparison. As a result, the amount of time to perform the search can be reduced, as less data is sensed, retrieved, and loaded for comparison.

Referring back to the memory component 102, the non-volatile memory can include, but is not limited to, read-only memory (ROM), flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, electrically erasable PROM (EEPROM), and/or nonvolatile RAM (e.g., ferroelectric RAM (FeRAM)). A flash memory can be comprised of NAND memory and/or NOR memory, for example. Volatile memory can include, but is not limited to, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Turning to FIG. 2, depicted is a block diagram of a portion of a memory 200 that can facilitate storage of data in accordance with an aspect of the disclosed subject matter. The memory 200 can be comprised of a memory array 202 that can contain a plurality of pages 204 that can be comprised of and/or associated with memory cells (not shown) in which data can be stored. Each page 204 can store a predetermined number of bits of data. Each page 204 can include a portion of the page 204 that can store data, such as user data, and a portion of the page 204 can store spare data, such as metadata, wherein, for example, the metadata can include a data pattern that can facilitate identifying an LBA and/or associated memory location (e.g., PBA) and/or associated data stored in the PBA contained in a particular page 204.

The memory array 202 can also contain a predetermined number of blocks 206 wherein each block 206 can contain a predetermined number of pages 204. For example, in one embodiment, there can be 512 pages 204 per block 206. In one aspect, the memory 200 can be a portion of memory component 102 (e.g., as described herein, for example, with regard to system 100). For example, memory array 104 (e.g., illustrated in FIG. 1 and described herein) can be and/or can comprise the memory array 202. In another aspect the memory 200 can comprise a nonvolatile memory (e.g., single-bit flash memory, multi-bit flash memory).

Turning to FIG. 3, depicted is a diagram of a system 300 that can facilitate a search for a memory location to facilitate access of a memory in accordance with an aspect of the disclosed subject matter. System 300 can include a memory component 102 that can comprise a non-volatile memory (e.g., flash memory) and/or volatile memory (e.g., random access memory (RAM)). The memory component 102 can receive information, including data, commands, and/or other information, which the memory component 102 can process (e.g., store data, execute commands, etc.). The memory component 102 can include a memory array 104 that can receive and store data. The memory array 104 can include a plurality of memory cells (not shown in FIG. 3; as shown in FIG. 6) wherein each memory cell can store one or more bits of data. Data stored in a memory cell(s) in the memory array 104 can be read and such data can be provided as an output, or can be erased from the memory cell(s). The memory component 102 can also include a search component 106 that can facilitate searching the memory array 104 to locate an LBA and/or associated memory location and/or associated data based in part on a command. The memory component 102, memory array 104, and search component 106 each can be the same or similar as, and/or each can contain the same or similar functionality as, respective components more fully described herein, for example, with regard to system 100 and/or memory 200.

System 300 can include a processor component 302 that can be associated with the memory component 102. In accordance with an embodiment of the disclosed subject matter, the processor component 302 can be a typical applications processor that can manage communications and run applications. For example, the processor component 302 can be a processor that can be utilized by a computer, mobile handset, personal data assistant (PDA), or other electronic device. The processor component 302 can generate commands, including read, write, and/or erase commands, in order to facilitate reading data from, writing data to, and/or erasing data from the memory component 102.

The communication of information between the processor component 302 and the memory component 102 can be facilitated via a bus that can be comprised of any of several types of bus structure(s) including, but not limited to, a peripheral bus or external bus, and/or a local bus using any variety of available bus architectures including, but not limited to, Open NAND Flash Interface, Compact Flash Interface, Multimedia Card (MMC), Secure Digital (SD), CE-ATA, Intelligent Drive Electronics (IDE), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

In one aspect, the processor component 302 can generate a command(s) to perform an operation (e.g., write, read, verify, erase) on a memory location in the memory array 104. The memory location can be associated with an LBA, and the command can include information regarding the LBA to facilitate locating the desired memory location in the memory array 104. The command can also include an LBA, a data pattern associated with the LBA, which can be compared to metadata (e.g., data pattern) in a memory location to facilitate determining whether a particular memory location is the memory location associated with the LBA specified in the command. The command can further include other information, such as, for example, memory device information (e.g., information that indicates, or facilitates selection and/or access of, a particular memory device (e.g., memory component 102) when there is more than one memory device associated with the processor component 302), block offset or a specified block number, page offset, and/or page area offset to facilitate focusing the search to begin at a desired block, and/or to begin at a desired page within a block, and/or to retrieve and/or evaluate a portion of a page (e.g., a spare area of the page that can contain metadata). The command can also contain search information (e.g., search up, search down), search termination information (e.g. search terminates after a predetermined maximum number of searches for the logical block address has been performed), and/or other information.

In accordance with an aspect, the processor component 302 can comprise a translation layer(s) (e.g., flash translation layer associated with a flash memory), which the processor component 302 can facilitate operating in order to facilitate communicating with and/or accessing the memory component 102. The translation layer can be structured based in part on the memory component 102, so that the processor component 302 can have information regarding the memory component 102 to facilitate communicating with and/or accessing the memory component 102. For example, the translation layer can include information regarding various parameters associated with the memory component 102, such as information regarding the formatting of data within the pages of the memory component 102, offset information (e.g., block offset, page offset, page area offset, etc.), and/or information regarding the usage of blocks (e.g., e-blocks) within the memory component 102. Based in part on the translation layer, the processor component 302 can structure commands and can include information related to the translation layer, so that the commands can be properly executed in the memory component 102.

In another aspect, the translation layer can be specific to a particular memory component (e.g., 102). That is, disparate translation layers can be created for disparate memory components, and the processor component 302 can include and utilize the disparate translation layers with respective memory components 102 associated with the processor component 102.

In one aspect, the memory component 102 can also include a controller component 304 that can facilitate control of the flow of data to and from the memory component 102. In an aspect, the controller component 304, by itself or in conjunction with the processor component 302, can facilitate execution of operations (e.g., read, write, verify, erase) associated with memory locations in the memory array 104. In another aspect, the controller component 304 can facilitate verifying and/or maintaining the desired charge level(s) associated with data stored in the memory locations in the memory array 104.

In accordance with one aspect of the disclosed subject matter, the controller component 304 can receive the command from the processor component 302 and can facilitate controlling the search of the memory array 104 to locate desired LBAs, associated memory locations, and/or associated data based in part on command information. The controller component 304 can work in conjunction with the search component 106 to facilitate performing a search of the memory array 104. For example, the controller component 304 can facilitate focusing a search by controlling the search component 106 so that the search can begin at a particular block, a particular page in a block, and/or a particular portion of a page, based in part on the command information. The controller component 304 can also facilitate providing information to the processor component 302 regarding the search of the memory array 104, such as information indicating that a search is complete, information regarding a location of a desired LBA in the memory array 104, information regarding a terminated search because the desired LBA has not been located within a predetermined number of searches, and/or other information.

Based in part on the command information received from the processor component 302 and/or the control information from the controller component 304, the search component 106 can facilitate searching the memory component 102 to locate the desired LBA (and page associated therewith) and/or associated memory location and/or associated data. In one aspect, the search component 106 can facilitate starting a search of a portion of a page in a block in a memory array 104 based in part on block information (e.g., block offset, specified block), page offset, and/or page area offset, which can be included in a command, to locate a desired LBA associated with the command. The command can also include search procedure information, such as searching upward in the block from the first (or current) page searched or searching downward in the block from the first (or current) page searched. In one aspect, the controller component 304 can include default search information or parameters (e.g., respective offsets, search procedure, etc.) that can be independently employed when a command fails to include a particular parameter.

For example, the command can specify a block offset and the controller component 304 can direct the search component 106 to begin the search at a particular block in the memory array 104 based in part on the block offset. The command also can specify a page offset, and the controller component 304 can direct the search component 106 to begin the search at a particular page within a block in the memory array 104 based in part on the page offset. As further example, the command also can specify a page area offset, and the controller component 304 can direct the search component 106 to begin the search at a particular area (e.g., spare area) of a page within a block in the memory array 104 based in part on the page area offset. Such offset information can facilitate focusing the search, which can reduce amount of time to locate the desired LBA.

In another aspect, the controller component 304 can employ a free page pointer (not shown) that can point to a page within a block, for example, to indicate that pages on one side of the pointer are unused and thus have no valid data, and pages on the other side of the pointer currently have data stored therein. The pointer can facilitate searches of the memory component 102, as a search can be focused to begin at the page indicated by the pointer and can proceed through other pages that have data stored therein, as desired, as opposed to searching pages that have no data stored therein. For example, the pointer can be employed when the command does not specify a page offset, and/or can be employed in conjunction with page offset information to facilitate focusing the search for the desired LBA in the memory component 102.

In one aspect, the search component 106 can include a sensor component 306 that can comprise a predetermined number of data sensor components 308 (e.g. sense amps) that can sense or detect data values (e.g., bit value, symbol value) of bits (or symbols) of data contained in a portion of a page of data, where the portion of page of data can be selected based in part on the page area offset associated with the command. The sensed data can be transferred from the data sensor components 308 and loaded into a register component 310. If the amount of data associated with the portion of the page is greater than the number of data sensor components 308 in the sensor component 306, the sensor component 306 can perform one or more additional senses and/or detections of data to have the data sensor components 308 sense and/or detect other areas of the portion of the page to determine the data values of data stored in such area(s) of the page and the sensed data values can be loaded into the register component 310. In one aspect, the sensed and/or detected data can be metadata (e.g. data pattern) associated with the LBA and/or memory location in the page, which can be utilized to determine whether the LBA is the correct LBA based on the command.

For example, a sensor component 306 can be comprised of 8 data sensor components 308 that can sense 8 bits of data (e.g., 8 contiguous bits of data) simultaneously. A portion of the page (e.g. spare area) that can contain the data pattern associated with the memory location, where the data pattern can comprise 18 bits of data, for instance. The sensor component 306 can sense the data values for the first 8 bits of the portion of the page, and the sensed data can be loaded into the register component 310. The sensor component 306 can sense the next 8 bits of data in the portion of the page, and such data can be loaded into the register component 310; and also can sense the next 8 bits of data, which can be loaded into the register component 310. Thus, in this example, there can be 24 bits of data loaded into the register component 310, where a subset of the 24 bits of data can be the 18 bits of data that can comprise the data pattern.

In another aspect, the register component 310 can facilitate shifting or rotating the data in the register component 310 based in part on the offset specified in the command so that the data can be placed in the proper order in the register component 308 to facilitate comparing the data to the data pattern provided with the command. In one aspect, the controller component 304 can facilitate controlling the shift or rotation of the data by providing information and/or direction to the register component 310 to facilitate such data manipulation (e.g., shift, rotation). For instance, continuing with the example above, there can be 24 bits of data loaded into the register component 310, wherein 18 bits of the 24 bits of data can be a data pattern associated with the memory location in the page of data in the memory array 104. The loaded data can be shifted (or rotated) to move the data in the register component 310 so that the least significant bit (LSB) of the data pattern is in the proper position in the register component 310 as well as all other bits of data in relation to the LSB in order to facilitate an accurate comparison with the data pattern of the command. For instance, the LSB of the data pattern contained in the 24 bits of data can be in position 4 (e.g. where the 24 bits can be loaded from position 0 to position 23 in the register component 310) of the register component 310, and the data can be shifted so that the LSB is in position 0 of the register component 310 to facilitate a comparison of the retrieved data pattern to the data pattern provided in the command.

In still another aspect, the search component 106 can include a mask component 312 that can facilitate masking non-determinate bits from the data loaded into the register component 310 to facilitate a comparison of only those bits in the retrieved data that are part of the data pattern. For instance, continuing with the above example, 24 bits of data are retrieved from the portion of the page and loaded into the register component 310, and of those 24 bits, there can be the data pattern that can be 18 bits in length. Thus, there can be 6 bits of the 24 bits that can be non-determinate. The data in the register component 310 can be provided to the mask component 312, and the mask component 310 can mask the data to set the non-determinate bits of the data to a known value (e.g., 0) to facilitate a comparison of only the determinate bits (e.g., 18 bits) of the data pattern to the data pattern provided in the command.

In yet another aspect, the search component 106 can include a comparator component 314 that can compare the retrieved data pattern (e.g., which can be the retrieve data, as shifted, rotated, and/or masked) to the data pattern associated with the command to facilitate determining whether the LBA associated with the retrieved portion of the page is the desired LBA. The comparator component 314 can receive the data pattern associated with the command, which can be loaded into one side of the comparator component 314, and can receive the retrieved data pattern associated with the portion of the page, which can be loaded into another side of the comparator component 314, and can compare the data patterns to determine whether there is a match.

In accordance with one aspect, if the data patterns match each other, the search for the desired LBA can be complete, as the desired LBA is located, and the memory controller 304 can facilitate retrieving the page in which the LBA is located and can load that page into a buffer component 316, wherein the buffer component can comprise a page buffer, which can be a volatile memory (e.g. SRAM, DRAM, etc.) that can store the page of data. For example, the buffer component 316 can temporarily store data (e.g. page of data), to facilitate the communication of data between the memory component 102 and other components, such as the processor component 302.

In another aspect, the controller component 304 can provide the processor component 302 information that can indicate that the desired LBA, associated memory location, and/or associated data is located, and/or that the page associated with the desired LBA is loaded and ready to be provided to the processor component 302.

In yet another aspect, if the retrieved data pattern does not match the data pattern associated with the command, the controller component 304 in conjunction with search component 106 can continue the search by proceeding to the next page in the block and retrieving the data pattern contained in the portion of the page based in part on the offset, and can compare such data pattern to determine whether there is a match, and so on, until either the desired LBA is located or until a predetermined maximum number of pages have been searched without the desired LBA being located, where the predetermined maximum number of page can be based in part on search termination information associated with the command, for example. In still another aspect, if a predetermined number of pages have been searched without the desired LBA being located, the controller component 304 can terminate the search and/or can provide the processor component 302 information that can indicate the desired LBA is not located and/or that the search has been terminated.

It is to be appreciated and understood that it is possible for there to be more than one page in the memory component 102 that can contain the data pattern associated with the desired LBA. For example, a first page can contain the desired LBA, and the data associated with the LBA can be updated (e.g., re-written) and/or moved to a second page, where the data in the first page can remain (until erased), but can now be antiquated. The data pattern associated with the LBA can be stored in the second page. When a search is performed, the search can be structured such that the data pattern associated with the most recent page (e.g. the second page with the updated data) can be retrieved and compared, and the desired LBA and associated data located, and the search component 106 can stop the search and not search the first page. For instance, the first page can be page 23 in a block and the second page can be page 67 in the block. In one aspect, the search parameters (e.g., page offset) can control the search so that the search begins from the last page that was accessed and the search can proceed in order through the pages from most recently accessed to oldest page accessed. Thus, the search component 106 can search page 67 first, and the data pattern associated with the desired LBA can be compared and the desired LBA located in page 67, where the search can stop due to being successfully completed.

In accordance with another aspect, the controller component 304 can facilitate a search of the entire memory component 102 to locate a desired LBA based in part on a command received from the processor component 302. For example, a command can be structured such that the command does not include information regarding a particular block or block offset that can identify the block in the memory array 104 at which the search is to begin. The controller component 304 can receive such command and can facilitate performing a search of the entire memory array 104 to locate the desired LBA until the desired LBA is located or the search is terminated, for example, based in part on search termination information included in the command.

To illustrate with a non-limiting example of a search of a memory component 102, the exemplary memory component 102 can comprise 512 blocks that can each contain 512 pages, wherein each page can have 512 areas, which can be data areas and/or spare areas. The memory component 102 can include a controller component 304 and a search component 106 that contains a sensor component that can detect data stored in a page in 8-bits chunks. A processor component 302 can generate a command to locate and retrieve the page that contains LBA 43. The command can specify the search is to locate LBA 43, and can contain a 14-bit data pattern that can be associated with LBA 43; search parameters that specify memory device 1 (e.g., memory component 102), a block offset of 100, a page offset of 50, and a page area offset of 30; can specify that the search of the block is to proceed upward; and can specify that the search is to be terminated if the desired LBA is not located within 1000 searches.

The memory component 102 can receive the command, and the controller component can direct the search component 106 to begin the search in block 100, at page 50 in the block, and can further direct the search component 106 to retrieve the data in page area 30 of the page. The sensor component 306 can sense the first 8-bit chunk of data and can load the data into the register component 310. The sensor component 306 can sense another 8-bit chunk of data and can load such data in the register component 310. The sensor component 306 can be directed to stop retrieving data, as the metadata (e.g., data pattern) desired for comparison can be 14 bits of the 16 bits of data loaded into the register component 310.

The 16 bits of data in the register component can be rotated in the register such that the LSB of the data can be in the LSB position of the register. The data can be provided to the mask component 312, where the 2 non-determinate bits can be masked by setting them to a known value of 0, so that only the 14 bits of the data pattern can be utilized for comparison with the data pattern provided with the command.

The data, as rotated and/or masked, can be provided to the comparator component 314, and the data pattern provided with the command can be provided to the comparator component 314. The comparator component 314 can compare the 14 bits (e.g., determinate bits of metadata) of data retrieved from the portion of the page and can compare them to the data pattern associated with the command to determine whether they match. If there is a match, the comparator component 314 can provide an indication to the controller component 304 that there is a match, and thus, the desired LBA 43 is located. The controller component 304 can direct that the page associated with the metadata be retrieved from the memory array 104 and loaded into the buffer component 316. The page can be loaded into the buffer component 314, and the controller component 304 can provide information to the processor component 302 that can indicate that the search is complete, LBA 43 is located, the search is successful, the page associated with LBA 43 is loaded and ready to be provided to the processor component 302, and/or other information. The processor component 302 can indicate that it is ready to receive the data, and the memory component 102 can provide the page of data to the processor component 302 for further processing.

The subject innovation, by offloading the data searches, such as LBA searches, to the memory component 102 can facilitate improving system performance. As the memory component 102 is controlling and performing the searches, the processor component 302 can remain unencumbered, and, as a result, the processor component is free to perform other functions, which can thereby improve overall system performance. Further, the amount of time to perform searches in the memory component 102 can be significantly reduced because less data is sensed, retrieved, and loaded for comparison, as compared to searches performed by conventional systems. The search by the search component 106 can be focused so that only the region of the page that is of interest (e.g., the spare area of the page that contains the data pattern) can be retrieved, as compared to conventional searches, where the entire page was retrieved and offset before being provided to the processor component for comparison.

The subject innovation also can facilitate reducing the amount of communication between the memory component 102 and the processor component 302 during searches in the memory component 102, as compared to searches associated with conventional systems, which can thereby significantly reduce the amount of time to perform the searches and can free the processor component to perform other functions and/or operations. As the memory component 102 is performing the searches, once the command is received by the memory component 102 from the processor component 302, the memory component 102 and the processor component 302 do not have to communicate with each other regarding the search until the search is successfully completed or terminated. Conventionally, during the search, the processor component 302 communicates with the memory component 102 in order to receive each page of data for comparison with the data pattern, which is performed by the processor component 302.

Figure 4:
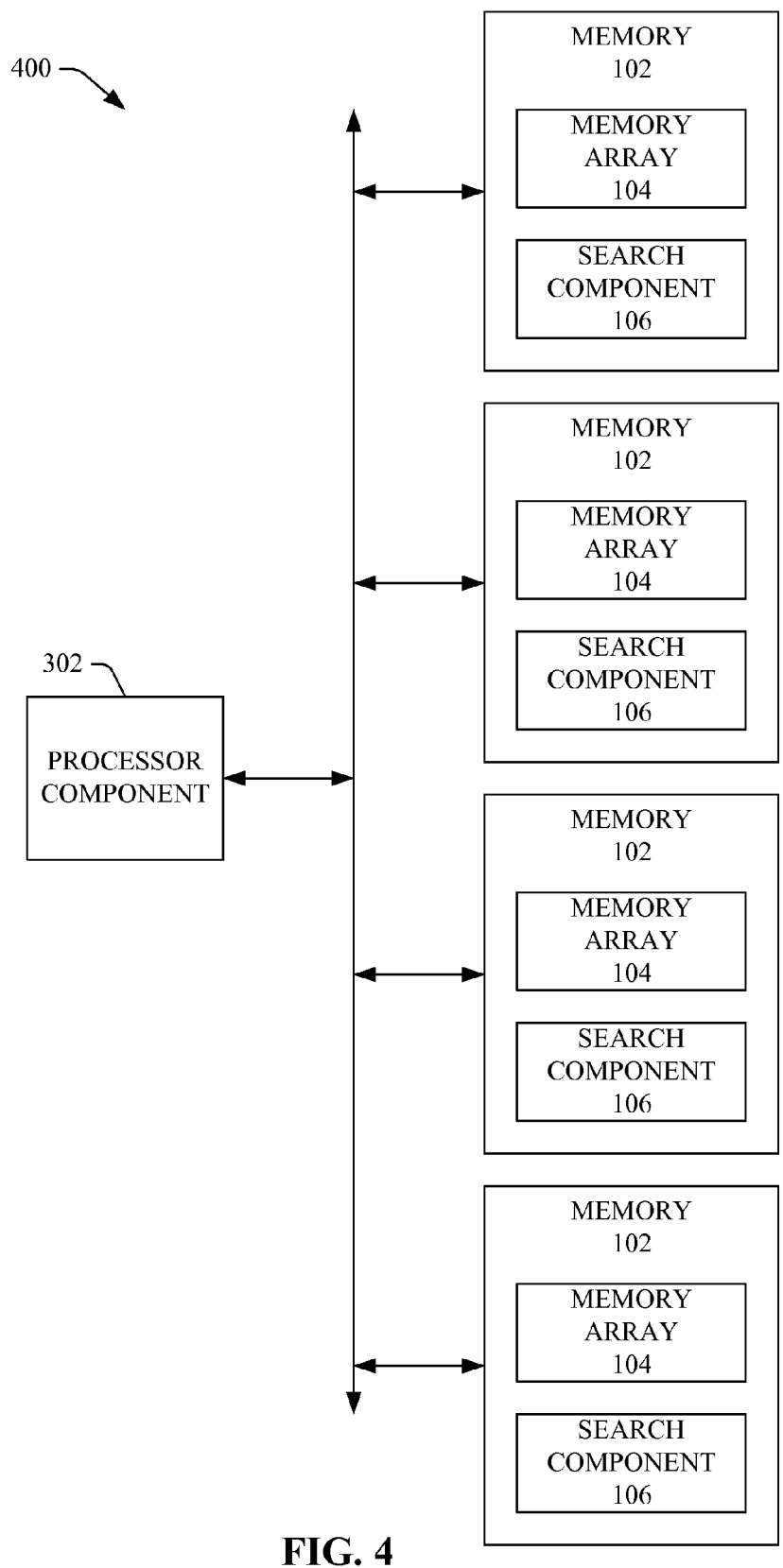
FIG. 4 illustrates a block diagram of a system that can facilitate an interleave of information searches to access of information associated with memory components in accordance with an aspect of the disclosed subject matter.

Referring to FIG. 4, illustrated is a block diagram of a system 400 that can employ an interleave to facilitate access of data associated with multiple memory components in accordance with an aspect of the disclosed subject matter. System 400 can include a plurality of memory components 102 that can facilitate storing data, wherein each memory component 102 can be identical or substantially identical to each other memory component 102. Each memory component 102 can be comprised of a memory array 104 which can include a plurality of pages (e.g., page 202, as depicted in FIG. 2 and described herein) that each can include a plurality of memory locations (e.g., memory cells, such as depicted in FIG. 6) wherein, for each memory location, one or more bits of data can be stored. Each memory component 102 can also contain a search component 106 that can facilitate searching for a particular LBA in a page of data based in part on metadata (e.g., a data pattern) associated with the particular LBA, where the metadata can be stored in a spare area of the page, for example. In one aspect, a received command can include a data pattern associated with the page desired by the command and such data pattern can be compared to a portion of the metadata associated with a page to determine whether the LBA associated with the metadata is the LBA desired by the command. It is to be appreciated and understood that the memory components 102, memory arrays 104, and search components 106 each can be the same or similar, and/or can contain the same or similar functionality, as respective components, as more fully described herein, for example, with regard to system 100 and/or system 300.

Each memory component 102 can be associated with a processor component 302 via a bus. The processor component 302 can generate and provide (e.g., transmit) commands to the memory components 102 to access memory locations and/or data respectively associated with each of the memory components 102. A command can include memory component information to facilitate selecting the desired memory component 102 in which the desired LBA can reside, a data pattern that can be the same as the data pattern associated with the desired LBA, block offset and/or block number information, page offset information, page area offset information, search up/search down information, and/or other information, as more fully described herein, for example, with regard to system 100, in order to facilitate focusing the search for the desired LBA. It is to be appreciated that the processor component 302 can be the same or similar, and/or can contain the same or similar functionality, as respective components, as more fully described herein, for example, with regard to system 300.

In accordance with one aspect of the disclosed subject matter, interleaving of the searches for LBAs in the memory components 102 can be employed to facilitate efficient accessing of memory locations and/or data in the memory components 102. The processor component 302 can generate and provide a command to a first memory component 102, wherein the command can include information, such as a data pattern, offset information, etc., associated with an LBA desired by the processor component 302. The search component 106 of the first memory component 102 can utilize the command information to facilitate focusing the search for the LBA and locating the desired LBA in a page of data associated with the memory array 104 of the first memory component 102.

As the first memory component 102 is performing a search of stored pages to locate the desired LBA, the processor component 302 can generate another command to facilitate locating the desired LBA that can be stored in a page of data in a second memory component 102. The search component 106 of the second memory component 102 can utilize the command information to facilitate focusing the search and locating the desired LBA in the page of data from the memory array 104 of the second memory component 102. Similarly, the processor component 302 can generate command(s) and provide such command(s) to the third memory component 102 and/or fourth memory component 102 (and/or more memory components (not shown)) to facilitate retrieving data from the third memory component 102 and/or fourth memory component 102, while other memory components (e.g. first memory component 102 and/or second memory component 102) are performing searches to locate the desired LBAs in respective pages of data stored in respective memory components 102.

In this manner, the searches for LBAs in pages of data respectively associated with each memory component 102 can be interleaved so that the data searches can be performed simultaneously, or substantially simultaneously, in parallel, by each respective search component 106. During such LBA searches, the processor component 302 can remain unencumbered with respect to the searches, as the LBA searches can be offloaded to the memory components 102, which can each manage the respective LBA search associated with the particular memory component 102. As a result, the processor component 302 can perform other functions and/or operations, as the processor component 302 does not have to manage the performance of the LBA searches.

When a memory component 102 locates a desired LBA in the portion of the page of data, such memory component 102 can load the page associated with the located LBA into a temporary storage (e.g., buffer component 316, as illustrated in FIG. 3 and described herein), and can indicate and/or confirm to the processor component 302 that the desired LBA has been located and/or the associated page is retrieved, such as providing a "ready" signal to the processor component 302. Such page of data can be provided to the processor component 302 to facilitate accessing the desired memory location associated with the LBA in such memory component 102 at a time the processor component 302 desires. As a memory component 102 waits for the processor component 302 to access and/or retrieve the page the page of data can remain in the temporary storage (e.g., buffer component 316, as illustrated in FIG. 3 and described herein).

Interleaving of the LBA searches associated with respective memory components 102 can facilitate efficient accessing of the memory component 102 and/or data retrieval, as there can be a reduction in time to locate the desired LBAs in the memory components 102 and/or access memory locations respectively associated with LBAs, and/or retrieve pieces of data respectively stored in the memory locations due in part to each memory component 102 performing an LBA search independent from, and/or in parallel with, another memory component(s) 102 of system 300.

For example, a memory component 102 employing the search component 106 can facilitate significantly reducing the amount of time utilized to locate a desired LBA in the memory array 104 of the memory component 102 and/or retrieve a page of data associated therewith, as compared to conventional memories. When multiple memory components 102 are associated with a processor component 302, and interleaving of the LBA searches is employed so that parallel searches of respective memory components 102 can be performed, the overall speed of the system 300 can increase such that the speed of the LBA searches (and/or page retrieval) can be increased approximately X times, where X can be an integer and can represent the number of memory components 102 in the system 300.

It is to be appreciated that, while four memory components 102 are depicted in system 400, the subject innovation is not so limited, as the subject innovation can contain and employ interleaving for less than four memory components 102, for four memory components 102, or for more than four memory components 102.

Figure 5:
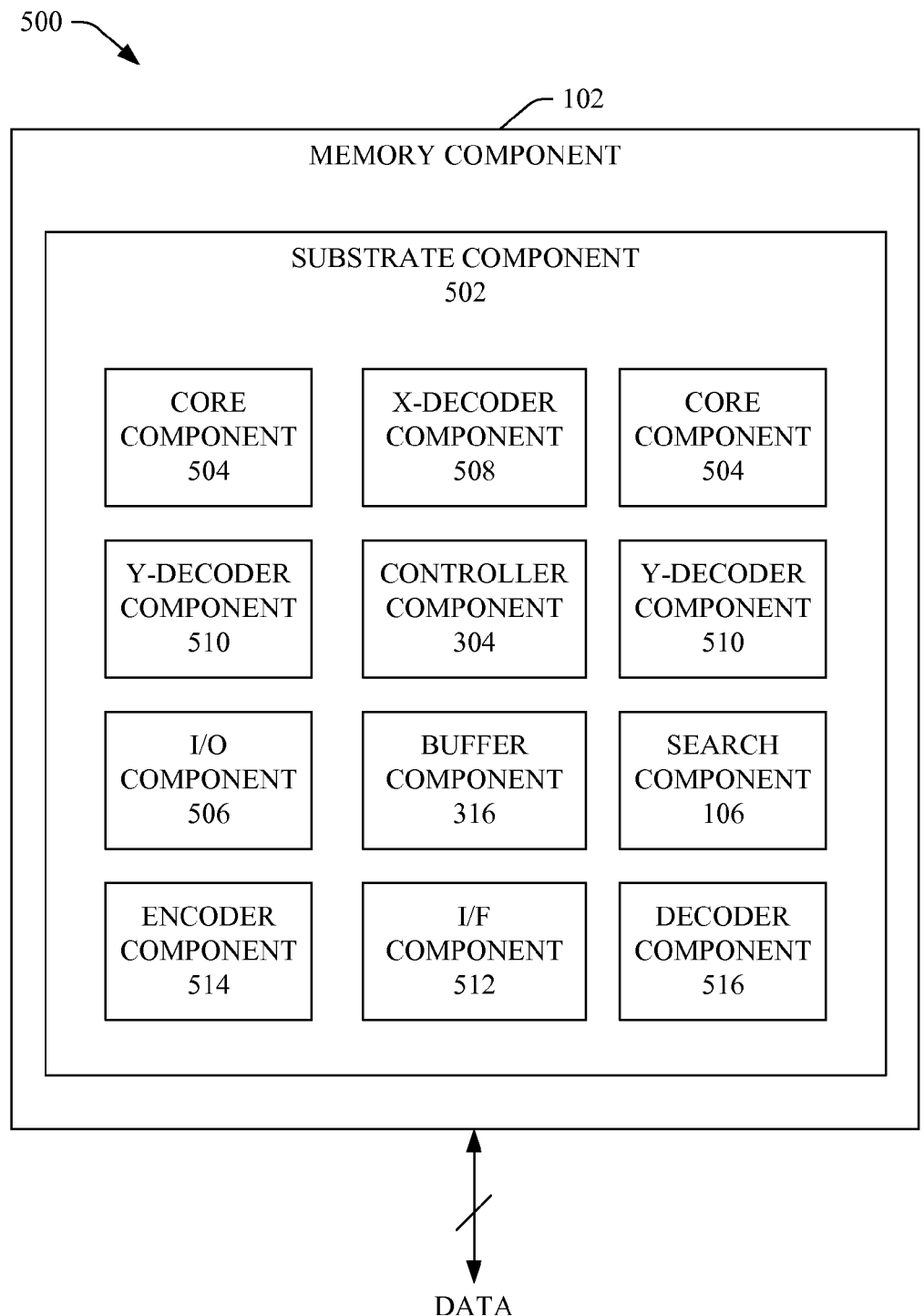
FIG. 5 depicts a block diagram of a system that can facilitate access of information associated with a memory component in accordance with an aspect of the disclosed subject matter.

Referring to FIG. 5, depicted is a block diagram of a system 500 that can facilitate access of data in a memory in accordance with an aspect of the disclosed subject matter. System 500 can include a memory component 102 that can be comprised of a non-volatile memory (e.g., single-bit flash memory, multi-bit flash memory) and/or volatile memory (e.g., SRAM). For example, the memory component 102 can comprise NOR flash memory and/or NAND flash memory. The memory component 102 can include a memory array (e.g. as illustrated in FIG. 1, FIG. 3, and FIG. 4, and described herein) that can be comprised of a plurality of memory cells (e.g. as depicted in FIG. 6), which can be memory locations, wherein, for each memory cell, one or more bits of data can be stored, and from which stored data can be read.

The memory component 102 can contain a search component 106 that can search the memory array 104 to locate LBAs to facilitate retrieving pages of data respectively associated therewith, accessing memory locations (e.g., PBAs) respectively associated therewith, and/or data respectively associated therewith. The memory component 102 can also contain a controller component 304 that can receive commands and can facilitate controlling searches by the search component 106 to locate LBAs in the memory array. Memory component 102 can include a buffer component 316 that can facilitate storing page(s) of data associated with LBAs identified and/or located by the search component 106. It is to be appreciated that the memory component 102, memory array 104, search component 106, controller component 304, and buffer component 316 each can be the same or similar as respective components, and/or can contain the same or similar functionality as respective components, as more fully described herein, for example, with regard to system 100, system 300, and/or system 400.

In one aspect, the memory component 102, including memory array 104, search component 106, controller component 304, and buffer component 316, and other components described herein, for example, with regard to system 500 can be formed and/or contained on a substrate component 502 (e.g., semiconductor substrate). In another aspect, one or more core components 504 (e.g., high-density core regions) and one or more lower-density peripheral regions can be formed on the substrate component 502. The core component(s) 504 typically can include one or more M by N arrays (e.g., memory array 104) of individually addressable, substantially identical multi-bit memory cells (as illustrated in FIG. 6 and described herein). The lower-density peripheral regions can typically include an input/output component 506 (e.g., input/output (I/O) circuitry) and programming circuitry for selectively addressing the individual memory cells. The programming circuitry can be represented in part by and can include one or more x-decoder components 508 and one or more y-decoder components 510 that can cooperate with the I/O component 506 for selectively connecting a source (not shown), gate (not shown), and/or drain (not shown) of selected addressed memory cells to predetermined voltages or impedances to effect designated operations (e.g. programming, reading, verifying, erasing) on the respective memory cells, and deriving necessary voltages to effect such operations. For example, an x-decoder component 508 and a y-decoder component 510 can each receive address bus information, which can be provided as part of a command, and such information can be utilized to facilitate determining the desired memory cell(s) in the memory component 102.

The memory component 102 can receive information (e.g., data, commands, etc.) via an interface component 512 (also referred to herein as "I/F 512"), which can also be formed on substrate component 502. I/F 512 can include and/or provide various adapters, connectors, channels, communication paths, etc. to integrate the memory component 102 into virtually any operating and/or database system(s) and/or with one another system(s). In addition, I/F 512 can provide various adapters, connectors, channels, communication paths, etc., that can provide for interaction and/or communication with a processor component 302 (e.g., as depicted in FIG. 3), and/or any other component, data, and the like, associated with the system 500.

The memory component 102 can also contain an encoder component 514 that can facilitate encoding data being programmed to the memory component 102, where the encoder component 514 also can be formed on the substrate component 502. For example, the encoder component 514 can facilitate converting a digital signal to an analog signal (e.g., current level) to facilitate programming data in the memory locations (e.g., memory cells) in the memory component 102.

The memory component 102 can further include a decoder component 516 that can facilitate decoding data being read from the memory component 102. The decoder component 516 can receive an analog signal associated with data, where the analog signal can be stored in the memory location in the memory array 104, and can facilitate converting the analog signal to a digital signal, so that such digital signal representing the read data can be provided to another component (e.g., processor component 302) for further processing.

Turning to FIG. 6, depicted is an example diagram of a portion of a memory array 602 that can be employed to facilitate storage of data in a memory in accordance with an aspect of the disclosed subject matter. The memory array 602 can include a plurality of memory cells 604 that each can be comprised of a drain (D), gate, and source (S). Each memory cell 604 can have one or more levels therein and can store one or more bits of data therein. The memory array 602 can be the same or similar to the memory array 104, as more fully described herein, and can be included in a memory component 102 (as described herein, for example, with regard to system 100, system 300, etc.).

The memory array 602 can be associated with an x-decoder component 508 (e.g. WL decoder) and a y-decoder component 510 (e.g., BL decoder) that can each respectively decode inputs/outputs during various operations (e.g., programming, reading, verifying, erasing) that can be performed on the memory cells 604. The x-decoder component 508 and y-decoder component 510 can each receive address bus information and/or other information, and can utilize such information to facilitate accessing or selecting the desired memory cell(s) 604 (e.g., memory location(s)) associated with the command. The x-decoder component 508 and y-decoder component 510 each can be the same or similar to respective components, as more fully described herein, and can be included in a memory component 102 (as described herein, for example, with regard to system 100, system 300, etc.).

The memory cells 604 can be formed in M rows and N columns. A common WL can be attached to the gate of each memory cell 604 in a row, such as word-lines WL0, WL1, WL2, through WLM. A common BL can be attached to each cell 604 in a column, such as bit-lines BL0, BL1, through BLN. A WL can contain, for example, 1024 elements forming multiple words and a sector can include, for example, 512 WLs to provide at least 512 k elements of memory. In accordance with an aspect of the disclosed subject matter, respective voltages can be applied to one or more cells 604 through the WLs and BLs to facilitate performing operations, such as program, read, erase, and the like.

In accordance with one embodiment of the disclosed subject matter, the memory component 102, and/or other components can be situated or implemented on a single integrated-circuit chip. In accordance with another embodiment, the memory component 102 and/or other components can be implemented on an application-specific integrated-circuit (ASIC) chip.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 7-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
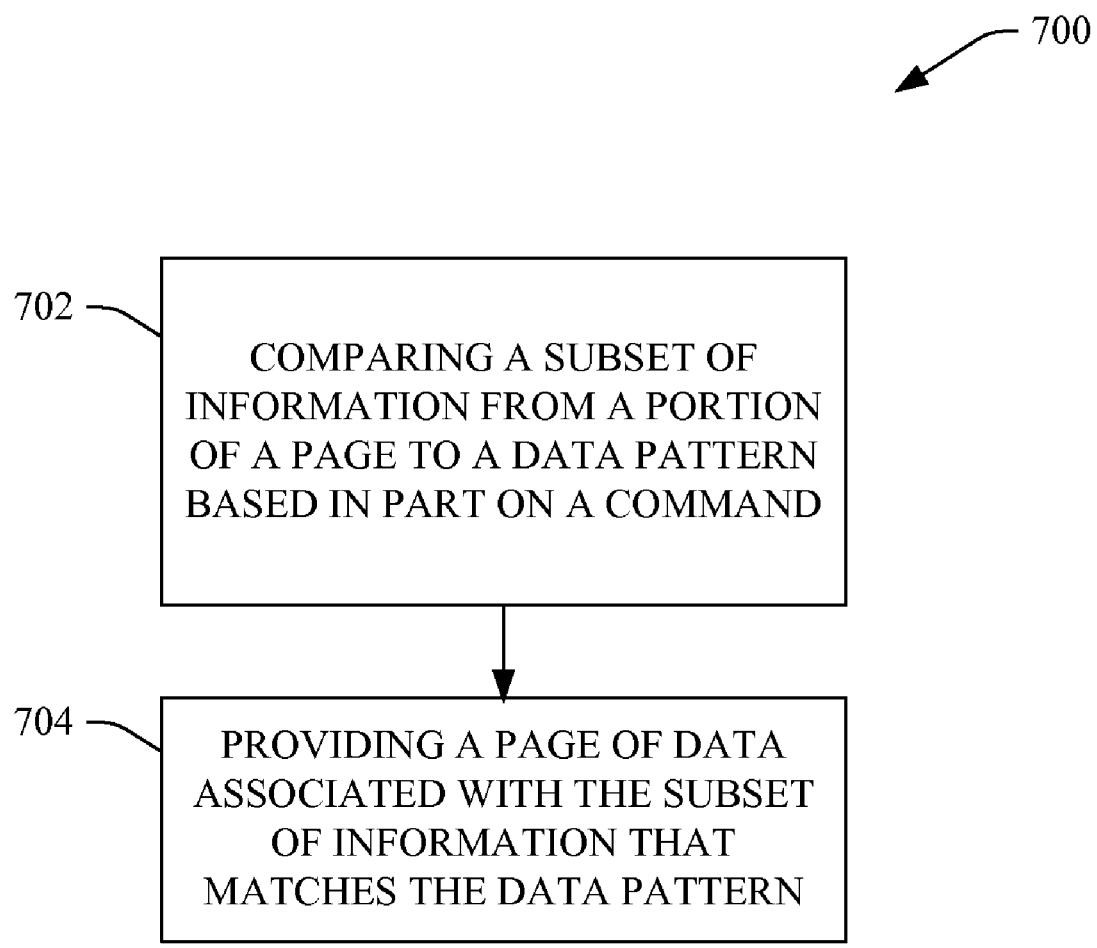
FIG. 7 depicts a methodology that can facilitate accessing data associated with a memory in accordance with an aspect of the disclosed subject matter.

Referring to FIG. 7, a methodology 700 that can facilitate accessing data associated with a memory(ies) in accordance with an aspect of the disclosed subject matter is illustrated. At 702, a subset of information received from a portion of a page in a memory component (e.g., 102) can be compared to a data pattern based in part on a command. In one aspect, the command can include information, such as an LBA associated with the desired memory location(s), a block location in the memory array 104 in which a desired memory location resides and/or a block offset to facilitate determining in which block the desired LBA and/or associated memory location resides, metadata information (e.g., data pattern) that can facilitate identifying the desired LBA, a page area offset that can specify which area of a page to examine, retrieve, load, and/or evaluate to facilitate determining whether such page contains the desired LBA, a page offset to facilitate determining at which page in a block to begin searching, search procedure information (e.g., search up from start point, search down from start point), search termination information, and/or other command information In accordance with another aspect, a search component (e.g., 106) can scan a portion of a page, such as a spare area of a page, in the memory component to obtain data (e.g., metadata) associated with an LBA stored in that page. Such data can be manipulated (e.g., shifted, rotated, and/or masked), so that the information is in a desired order and non-determinate information has been removed and/or masked out, for example, by setting the non-determinate bits to a known value. The subset of information (e.g., data, as manipulated) can be a data pattern that can be associated with an LBA stored in the page. The subset of information can be compared to the data pattern associated with the desired LBA that can be received with the command to determine whether there the respective data patterns match.

At 704, a page of data associated with the subset of information can be loaded when the subset of information matches the data pattern in order to facilitate accessing the memory. In one aspect, the respective data pattern can be compared (e.g., at 702), and if the respective data patterns match, the LBA associated with the subset of information is the LBA desired by the command. The page of data associated with the desired LBA (e.g., located LBA) can be retrieved. The page of data can be loaded in a buffer component (e.g., 316) in the memory component, and the memory component can indicate to the processor component that the desired LBA is located and/or the associated page is loaded and ready to be provided to the processor component. The page of data can be provided to the processor component. At this point, methodology 700 can end.

Figure 8:
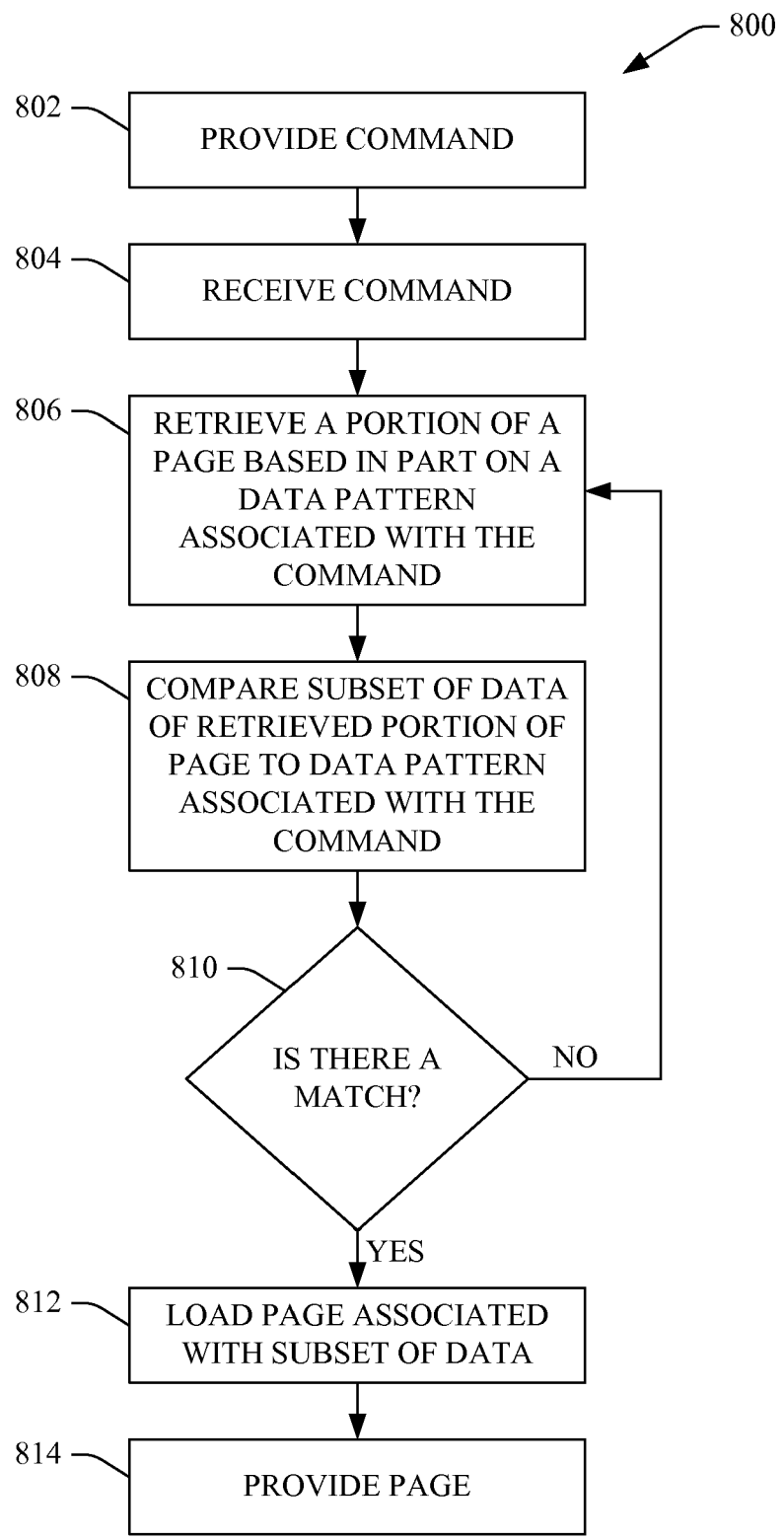
FIG. 8 illustrates a methodology that can facilitate accessing data in a memory in accordance with an aspect of the disclosed subject matter.

Turning to FIG. 8, depicted is a methodology 800 that can facilitate accessing data associated with a memory(ies) in accordance with an aspect of the disclosed subject matter. At 802, a command(s) can be provided. In one aspect, a processor component 302 can generate and/or provide a command(s). The command can include information that can facilitate performing an operation (e.g., read, write, verify, erase) associated with a memory component (e.g., 102). The command information can include memory component information, memory address information, bus information, a data pattern associated with the desired LBA stored in a page of data, block offset information and/or a specified block number, page offset information, page area offset information, search up/search down information, and/or other information, as more fully described herein, for example, with regard to system 100, system 300, system 400, and/or methodology 700.

In accordance with one embodiment, the memory component can be a nonvolatile memory (e.g. single-bit flash memory, multi-bit flash memory).

At 804, the command information can be received. In one aspect, the command information can be received by the memory component. At 806, a portion of a page(s) of data can be retrieved from the memory component based in part on a data pattern associated with the command information, where the retrieved portion of the page can contain metadata that can comprise a data pattern, which can be compared to a data pattern that can be provided with the command to determine whether such data patterns are the same to facilitate locating a desired LBA associated with the command. If the data patterns are the same, the LBA associated with the retrieved data pattern can be the LBA requested by the command.

In one aspect, the retrieved portion of the page (e.g., retrieved data from a spare area of the page) can be manipulated by shifting or rotating the data in a register component (e.g. 310), and/or a portion of the retrieved portion of the page can be masked by a mask component (e.g., 312) to filter out non-determinate information (e.g., non-determinate bits of data) to facilitate the search for the desired LBA, where the data can be in form of a data pattern that can be associated with the LBA stored in the page. At 808, the portion of the page (e.g., data pattern) can be compared to a data pattern associated with the command. In another aspect, the manipulated data can be loaded into a comparator component (e.g., 314), along with the data pattern associated with the command, and such data patterns can be compared to determine whether they match each other.

At 810, a determination can be made as to whether the retrieved data pattern is a match with the data pattern associated with the command. If it is determined that the data patterns do not match, the methodology 800 can return to reference numeral 806, where the next page in a block in the memory array 104 can be searched to retrieve a portion of that next page, and methodology 800 can proceed from that point.

If, at 810, it is determined that the data patterns match, at 812, the page associated with the retrieved data pattern can be loaded. In one aspect, if the data patterns match, it can be determined that the desired LBA is located in the memory component 102, and the page of data associated with the data pattern (and associated LBA) can be loaded into a buffer component (e.g., 316) in the memory component 102. In another aspect, the memory component 102 can provide information that can indicate to the processor component that the desired LBA has been located, the associated page of data is retrieved and loaded, and/or other information. At 814, the page of data associated with the located LBA can be provided as an output. In one aspect, the page of data can be provided as an output to the processor component, where it can be loaded in a register in the processor component. At this point, methodology 800 can end.

Figure 9:
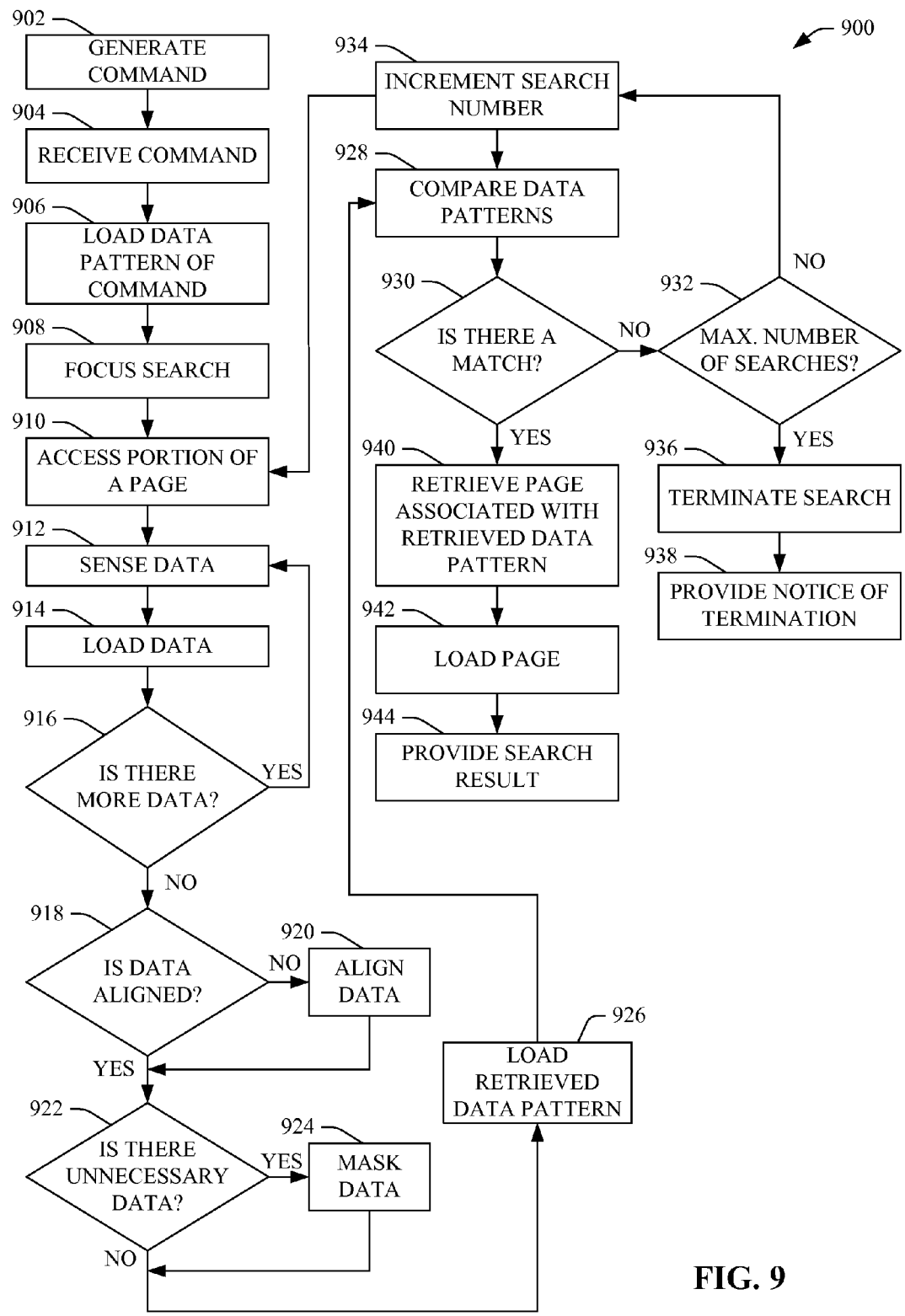
FIG. 9 depicts a methodology that can facilitate searching for information in a memory in accordance with an aspect of the disclosed subject matter.

FIG. 9 depicts a methodology 900 that can facilitate searching for information to facilitate accessing a memory in accordance with an aspect of the disclosed subject matter. At 902, a command(s) can be generated. In one aspect, a processor component (e.g., 302) can generate a command(s) and can provide the command(s) to a memory component(s) (e.g., 102). Each command can include information that can facilitate performing an operation (e.g., read, write, verify, erase) associated with a memory component (e.g., 102). The command information can contain memory component information, memory address information, bus information, a data pattern associated with the desired LBA stored in a page of data, block offset information and/or a specified block number, page offset information, page area offset information, search up/search down information, search termination information, and/or other information, as more fully described herein, for example, with regard to system 100, system 300, system 400, and/or methodology 700. In accordance with one embodiment, the memory component can be a nonvolatile memory (e.g., single-bit flash memory, multi-bit flash memory).

At 904, the command can be received. In one aspect, the command can be received by the memory component. At 906, a data pattern contained in the command can be loaded. In one aspect, the data pattern associated with the command can be loaded into a comparator component (e.g., 314).

At 908, the search can be focused based in part on the command. In one aspect, a controller component (e.g., 304) in conjunction with a search component (e.g., 106) can facilitate focusing the search of the memory component based in part on the command. In accordance with an aspect, the initial point of the search can be focused to begin at a particular block, page, and/or portion of a page, in the memory component based in part on the command. In one aspect, the command can contain information that can specify a particular block or block offset to facilitate focusing the search so that the search can begin at a particular block in the memory component. In another aspect, the command can specify a page offset that can facilitate initiating the search in a particular page in a block. In still another aspect, the command can specify a page area offset to focus the search to a region of a page, for example, where metadata (e.g., data pattern) can be located.

At 910, a portion of a page of data can be accessed. In one aspect, a portion of a page of data can be accessed from the memory component based in part on the command information (e.g., block, page, and/or page area offset information). At 912, the portion of the page can be sensed to detect data values of data stored in the portion of the page. In one aspect, a sensor component (e.g., 306) can sense and/or detect data values of respective bits (or symbols) of data stored in a portion of a page of data. At 914, the sensed data can be loaded. In one aspect, the sensed data can be loaded into a register component (e.g., 310) in the memory component. At 916, a determination can be made as to whether there is more data (e.g. metadata) to retrieve from the portion of the page. If it is determined that there is more data to be retrieved from the portion of the page, the methodology 900 can be returned to reference numeral 912 to sense other data contained in the portion of the page. For example, if data to be retrieved from a portion of a page is 24 bits, and the sensor component can sense 8 bits at a time, then there can be 3 senses by the sensor component and 3 loads of sensed data to retrieve the 24 bits of data.

If, at 916, it is determined that the data is retrieved and there is no more data to retrieve, at 918, a determination can be made as to whether the retrieved data is aligned. The command can contain information that can facilitate determining whether the data is to be aligned (e.g., shifted, rotated) in the register component. The controller component can facilitate aligning the data in the register component based in part on the command. If it is determined that the data is to be aligned, at 920, the data can be aligned. In one aspect, the register component can shift or rotate the data contained therein, based in part on the command information, to align the data in the register component such that the data can be in a form to facilitate comparison of the data with the data pattern associated with the command. For example, if the LSB of the data is in position 4 in the register component, the data can be rotated to place the LSB in position 0 in the register component, if the data pattern associated with the command has its LSB in position 0 for comparison in the comparator component (e.g., 314). At this point, methodology 900 can proceed to reference numeral 922. If, at 918, it is determined that the data is aligned, methodology 900 can proceed to reference numeral 922.

At 922, a determination can be made regarding whether there is unnecessary data in the retrieved data. In one aspect, the retrieved data can contain the data pattern associated with an LBA, but can also include other data that can be non-determinate. For example, a data pattern can comprise 18 bits of data. If the data is sensed and retrieved in groups of 8 because the sensor component senses 8 bits at a time, after 3 senses and loads, there can be 24 bits of data. Thus, there can be 6 bits of data that can be non-determinate. If it is determined that there is unnecessary data, at 924, the data can be masked. In one aspect, a mask register (e.g., 312) in the search component can mask out a non-determinate piece(s) (e.g., bit(s), symbol(s)) of the retrieved data, where the non-determinate piece(s) of retrieved data can be set to a known value (e.g., 0) to facilitate comparison of the portion of the retrieved data that comprising the data pattern associated with the LBA stored in the page with the data pattern associated with the command. It is to be understood and appreciated that the determinate data (e.g., data pattern) can be contiguous or non-contiguous in the register component. Thus, for example, a non-determinate bit of data can be positioned in between two determinate bits of data in the register component. The mask register can facilitate masking the non-determinate data regardless of the location of such data in the register component. At this point, methodology 900 can proceed to 926. If, at 922, it is determined that there is no unnecessary data, the methodology can proceed to reference numeral 926.

At 926, the data can be loaded. In one aspect, the data can be loaded into one side of the comparator component, where the data pattern associated with the command is loaded into the other side of the comparator component. In another aspect, the data loaded into the comparator component can be data, which can be aligned if alignment was performed at reference numeral 920 and/or masked if masking was performed at reference numeral 924, in accordance with methodology 900.

At 928, the data pattern associated with the command can be compared with the retrieved data pattern, which, for example, can be derived from the data retrieved from the portion of the page. In one aspect, the data pattern associated with the command can be loaded into one side of a comparator component and the retrieved data pattern (e.g., retrieved data as aligned and/or masked) can be loaded into the other side of the comparator component, and the comparator component can compare the respective data patterns to each other.

At 930, a determination can be made regarding whether the data pattern associated with the command matches the retrieved data pattern. If it is determined that the data patterns do not match, at 932, a determination can be made as to whether a maximum number of searches has been performed. If it is determined that the maximum number of searches has not been performed, at 934, a number associated with the number of searches can be incremented (e.g., incremented by 1), and methodology 900 can return to reference numeral 910 where a next page in a block in the memory array in the memory component can be accessed, and methodology 900 can proceed from that point. In one aspect, if it is determined that the data patterns do not match, comparator component can indicate to the controller component that the data patterns do not match and the controller component can facilitate determining whether the maximum number of searches have been performed, incrementing a search count, and/or accessing the next page in the block (or another block if no other pages left to search in the block) in the memory array in the memory component.

If at 932, it is determined that the maximum number of searches has been performed, at 936, the search for a desired LBA can be terminated. In one aspect, the controller component can facilitate determining that a predetermined maximum number of searches for the desired LBA in the memory array have been performed, where the maximum number can be based in part on information associated with the command, for example, and the controller component can facilitate terminating the search for the LBA. At 938, a notice of the terminated search can be provided as an output. In one aspect, the memory component can provide notice of the terminated search to the processor component.

Referring back to reference numeral 930, if, at 930, it is determined that the data pattern associated with the command is a match (e.g. is the same) as the retrieved data pattern, at 940, the page associated with the retrieved data pattern can be retrieved. In one aspect, if the comparator component can indicate to the controller component that the respective data patterns match, and the controller component can facilitate retrieving the page of data associated with the retrieved data pattern from the block in the memory array.

At 942, the page of data can be loaded. In one aspect, the page of data can be loaded into a buffer component (e.g., 316) in the memory component. At 944, a search result can be provided as an output. In one aspect, the search result can comprise the page of data retrieved from the memory array and stored in the buffer component, information that can indicate that the search for the LBA is complete, information that can indicate that that the page of data associated with the LBA is retrieved, and/or information indicate that the memory component is ready to communicate with the processor component can be provided to the processor component. At this point, methodology 900 can end.

Figure 10:
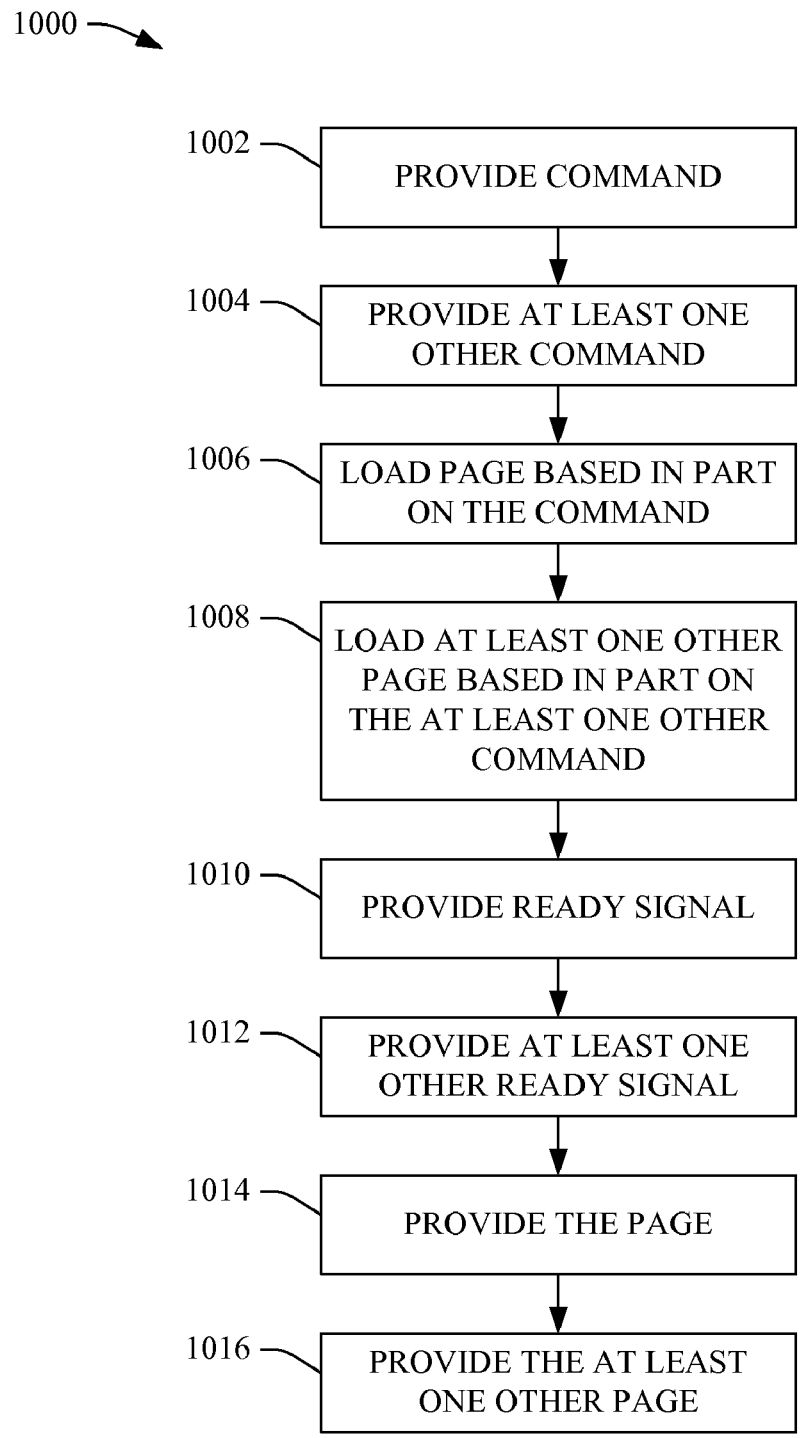
FIG. 10 illustrates a methodology that can facilitate interleaving memory searches associated with memory components in accordance with an aspect of the subject matter disclosed herein.

Turning to FIG. 10, illustrated is a methodology 1000 that can employ interleaving to facilitate accessing memory components in accordance with an aspect of the disclosed subject matter. At 1002, a command(s) can be provided. In one aspect, a processor component 302 can generate and/or provide a command(s) to a memory component (e.g., 102). In one aspect, the command can include information that can facilitate performing an operation (e.g., read, write, verify, erase) associated with the memory component. The command information can include memory component information to facilitate identifying a particular memory component, memory address information, bus information, a data pattern associated with the desired LBA stored in a page of data, block offset information and/or a specified block number, page offset information, page area offset information, search up/search down information, and/or other information, as more fully described herein, for example, with regard to system 100, system 300, system 400, and/or methodology 700. In accordance with one embodiment, the memory component can comprise a nonvolatile memory (e.g., single-bit flash memory, multi-bit flash memory).

At 1004, at least one other command can be provided. In one aspect, the processor component can generate at least one other command that can be provided to at least one other memory component. In accordance with another aspect, the memory component associated with the first command and the at least one other memory component associated with the at least one other command can respectively facilitate searching their respective memory arrays (e.g., 104) for respective LBAs associated with the respective commands in parallel and/or an interleaved manner to facilitate efficient searching and/or accessing of the memory components associated with the processor component. It is to be appreciated that there can be a plurality of memory components that can be associated with the processor component, where the searches of the memory array for desired LBAs and associated pages can be offloaded to such memory components, as opposed to such searches being performed by the processor component.

At 1006, a page of data can be loaded. In one aspect, the memory component, employing a controller component (e.g., 304) and search component (e.g., 106), can facilitate locating, retrieving and/or loading a page of data based in part on the command. For example, the command can comprise offset information (e.g., block offset, page offset, page area offset) and/or other information (e.g., data pattern) to facilitate locating an LBA and associated page in the memory array of the memory component, where the controller component can control the search of the memory array and the search component can facilitate searching the memory array and locating the desired LBA and associated page, retrieving the page, and/or loading the page into a buffer component (e.g., 316) associated with the memory component.

At 1008, at least one other page of data can be loaded. In one aspect, the at least one other memory component, employing an associated controller component (e.g., 304) and associated search component (e.g., 106), can facilitate locating, retrieving and/or loading the at least one other page of data based in part on the at least one other command. For example, the at least one other command can comprise offset information (e.g., block offset, page offset, page area offset) and/or other information (e.g., data pattern) to facilitate locating a particular LBA in a memory array of the at least one other memory component, where the controller component can control the search of the memory array and the search component can facilitate searching the memory array and locating the particular LBA and the at least one page of data associated therewith, retrieving that page of data, and/or loading that page of data into a buffer component (e.g., 316) associated with the at least one memory component.

At 1010, a ready signal can be provided. In one aspect, the controller component of the memory component can provide a ready signal to the processor component, where the ready signal can indicate that the LBA specified in the command is located and/or the page associated with the LBA is loaded and is ready to be provided to the processor component. At 1012, at least one other ready signal can be provided. In one aspect, the controller component of the at least one other memory component can provide the at least one other ready signal to the processor component, where the at least one other ready signal can indicate that the LBA specified in the at least one other command is located and/or the at least one other page associated with such LBA is loaded and is ready to be provided to the processor component.

At 1014, the page can be provided. In accordance with one aspect, the page retrieved and/or loaded as a result of the search of the memory array of the memory component by the search component can be provided to the processor component based in part on ready signal. At 1016, the at least one other page can be provided. In accordance with one aspect, the at least one other page retrieved and/or loaded as a result of the search of the memory array of the at least one other memory component by its search component can be provided to the processor component based in part on the at least one other ready signal.

It is to be appreciated and understood that the subject innovation is not limited by the acts illustrated and/or by the order of acts, as, for example, acts can occur in various orders and/or concurrently, and with other acts not presented and described herein. For example, it is possible that the search for an LBA and the at least one page of data can be located, retrieved, loaded, and/or provided, and/or the at least one other ready signal can be provided, to the processor component, before the search for the LBA and the page of data associated therewith can be located, retrieved, loaded, and/or provided, and/or the ready signal can be provided to the processor component, as such searches can depend in part on respective locations of the respective LBAs and respective pages of data in the respective memory components. At this point, methodology 1000 can end.

Figure 11:
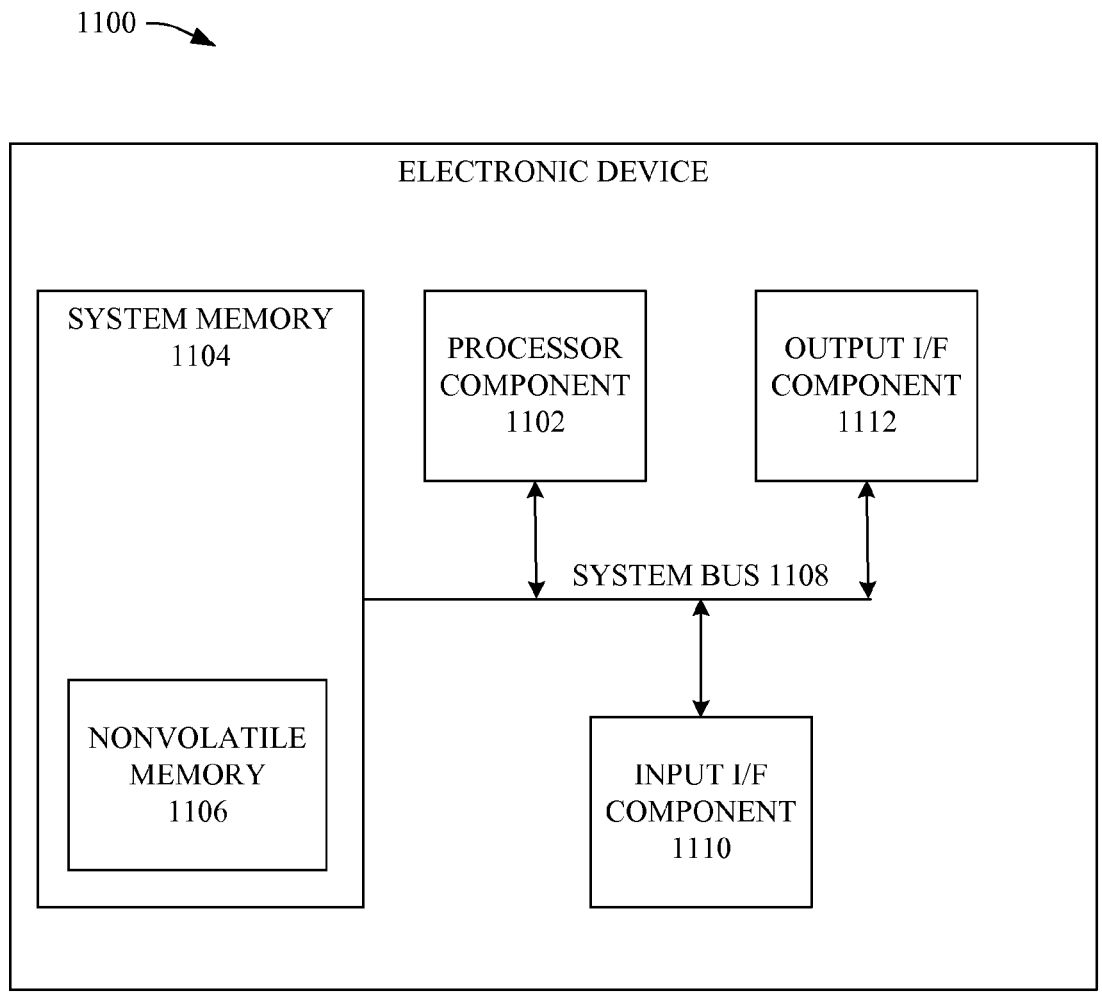
FIG. 11 illustrates an example of an electronic device that can be associated with a memory in accordance with an aspect of the disclosed subject matter.

Referring to FIG. 11, illustrated is a block diagram of an exemplary, non-limiting electronic device 1100 that can comprise and/or incorporate system 100, system 300, system 400, and/or system 500, or a respective portion(s) thereof. The electronic device 1100 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), set-top boxes, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 1100 can include, but are not limited to, a processor component 1102 (e.g. which can be and/or can include the same or similar functionality as processor component 302, as depicted in FIG. 3 and described herein), a system memory 1104, which can contain a nonvolatile memory 1106, and a system bus 1108 that can couple various system components including the system memory 1104 to the processor component 1102. The system bus 1108 can be any of several types of bus structures including a memory bus or memory controller, a peripheral bus, or a local bus using any of a variety of bus architectures.

Electronic device 1100 can typically include a variety of computer readable media. Computer readable media can be any available media that can be accessed by the electronic device 1100. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 1106 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1100. Communication media typically embodies computer readable instructions, data structures, program modules or other data in a modulated data signal such as a carrier wave or other transport mechanism and includes any information delivery media.

The system memory 1104 can include computer storage media in the form of volatile (e.g., SRAM) and/or nonvolatile memory 1106 (e.g. flash memory). For example, nonvolatile memory 1106 can be the same or similar, or can contain the same or similar functionality, as memory component 102 (e.g., as described with regard to system 100, system 300, system 400, etc.). A basic input/output system (BIOS), containing the basic routines that can facilitate transferring information between elements within electronic device 1100, such as during start-up, can be stored in the system memory 1104. The system memory 1104 typically also can contain data and/or program modules that can be accessible to and/or presently be operated on by the processor component 1102. By way of example, and not limitation, the system memory 1104 can also include an operating system(s), application programs, other program modules, and program data.

The nonvolatile memory 1106 can be removable or non-removable. For example, the nonvolatile memory 1106 can be in the form of a removable memory card or a USB flash drive. In accordance with one aspect, the nonvolatile memory 1106 can include flash memory (e.g., single-bit flash memory, multi-bit flash memory), ROM, PROM, EPROM, EEPROM, or NVRAM (e.g., FeRAM), or a combination thereof, for example. Further, a flash memory can comprise NOR flash memory and/or NAND flash memory. In accordance with another aspect, the nonvolatile memory 1106 can comprise one or more memory components (e.g. memory component 102, as illustrated in FIGS. 1, 3, 4, and/or 5, and described herein).

A user can enter commands and information into the electronic device 1100 through input devices (not shown) such as a keypad, microphone, tablet, or touch screen although other input devices can also be utilized. These and other input devices can be connected to the processor component 1102 through input interface component 1110 that can be connected to the system bus 1108. Other interface and bus structures, such as a parallel port, game port or a universal serial bus (USB) can also be utilized. A graphics subsystem (not shown) can also be connected to the system bus 1108. A display device (not shown) can be also connected to the system bus 1108 via an interface, such as output interface component 1112, which can in turn communicate with video memory. In addition to a display, the electronic device 1100 can also include other peripheral output devices such as speakers (not shown), which can be connected through output interface component 1112.

It is to be understood and appreciated that the computer-implemented programs and software can be implemented within a standard computer architecture. While some aspects of the disclosure have been described above in the general context of computer-executable instructions that can be run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

It is also to be understood and appreciated that cryptographic protocols can be employed to facilitate security of data associated with a memory (e.g. memory component 102) in accordance with the disclosed subject matter. For example, a cryptographic component (e.g., cryptographic engine) can be employed and can facilitate encrypting and/or decrypting data to facilitate securing data being written to, stored in, and/or read from the memory. The cryptographic component can provide symmetric cryptographic tools and accelerators (e.g., Twofish, Blowfish, AES, TDES, IDEA, CAST5, RC4, etc.) to facilitate data security. The cryptographic component can also provide asymmetric cryptographic accelerators and tools (e.g. RSA, Digital Signature Standard (DSS), and the like) to facilitate securing data. Additionally, the cryptographic component can provide accelerators and tools (e.g. Secure Hash Algorithm (SHA) and its variants such as, for example, SHA-0, SHA-1, SHA-224, SHA-256, SHA-384, and SHA-512) to facilitate data security.

It is to be appreciated and understood that authentication protocols can be employed to facilitate security of data associated with the memory (e.g., memory component 102) in accordance with the disclosed subject matter. For example, an authentication component can solicit authentication data from an entity, and, upon the authentication data so solicited, can be employed, individually and/or in conjunction with information acquired and ascertained as a result of biometric modalities employed, to facilitate control access to the memory. The authentication data can be in the form of a password (e.g., a sequence of humanly cognizable characters), a pass phrase (e.g. a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authentication component. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

As utilized herein, terms "component," "system," "interface," and the like, are intended to refer to a computer-related entity, either hardware, software (e.g. in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates access of at least one memory, comprising:
   the at least one memory that contains a plurality of memory locations to facilitate storage of data;
   a search component that searches the at least one memory and locates a logical block address associated with a memory location of the plurality of memory locations based in part on a data pattern associated with a command;
   a sensor component that detects data values of data stored in a portion of a page in the at least one memory array;
   a register component that receives data detected by the sensor component, the register component manipulates the data so that the data is in a proper order in the register component based in part on offset information associated with the command; and
   a mask component that receives the data, as manipulated, from the register component and masks non-determinate bits of the data to a known value.

2. The system of claim 1, further comprising:
   at least one memory array that is located in the at least one memory, the plurality of memory locations are situated in the at least one memory array; and
   a controller component that receives the command and provides control information to the search component to facilitate control of the search by the search component to locate the logical block address.

3. The system of claim 2, the search component searches for a logical block address in at least one of an entire portion of the at least one memory or focuses the search for the logical block address to a region in the at least one memory that is less than the entire portion of the at least one memory.

4. The system of claim 2, the controller component focuses a search for the logical block address in the at least one memory to begin at a particular place in the at least one memory based in part on the command, wherein the command contains at least one of information that identifies the at least one memory, block identification information, block offset information, page offset information, page area offset information, logical block address information, a data pattern, search termination information, or search order information, or a combination thereof.

5. The system of claim 2, the at least one memory array contains a predetermined number of blocks, and the logical block address is located within a page of a plurality of pages contained within a block in the at least one memory array.

6. The system of claim 5, the search component retrieves only a portion of a page that contains a data pattern associated with the logical block address.

7. The system of claim 1, further comprising:
   a comparator component that receives the data pattern associated with the command and receives the data from the mask component and compares the data pattern to determinate bits of the data to determine whether the determinate bits of the data match the data pattern and indicates whether there is a match; and
   a buffer component that receives a page containing a logical block address specified in the command, wherein the controller component facilitates retrieval of the page containing the logical block address specified in the command based in part on information from the comparator component that indicates the determinate bits of the data of the page match the data pattern, the controller component provides the page to the buffer component.

8. The system of claim 1, further comprising:
   a processor component that generates commands and facilitates execution of operations in the at least one memory, and generates at least one command to facilitate a search of the at least one memory, wherein the at least one memory is comprised of more than one memory, each memory comprises a respective search component, wherein the processor component generates and provides commands to each respective memory and the respective search component of each respective memory locates the respective logical block address in the respective memory, and a respective controller component of a respective memory provides an indicator signal to the processor component that indicates that at least one of a respective logical block address is located, a page associated with the respective logical block address is loaded, the search of the respective memory is complete, and the search of the respective memory is terminated.

9. The system of claim 8, wherein searches for respective logical block addresses in the respective memories are interleaved such that the searches in respective memories are performed in parallel.

10. The system of claim 1, the search component searches through pages in the at least one memory until the logical block address specified in the command is located or until a predetermined maximum number of searches has been performed based in part on search termination information associated with the command.

11. An electronic device comprising the system of claim 1.

12. The electronic device of claim 11, the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), an electronic control unit associated with a motor vehicle, a global positioning satellite (GPS) device, an electronic device associated with an airplane, an electronic device associated with an industrial control system, a Hardware Security Module (HSM), a set-top box, a secure memory device with computational capabilities, or an electronic device with at least one tamper-resistant chip.

13. A method that facilitates accessing at least one memory, comprising:
   comparing a subset of information received from a portion of a page in the at least one memory to a data pattern based in part on a command; and
   loading the page associated with the subset of information when the subset of information matches the data pattern to facilitate accessing the at least one memory;
   sensing data values of data stored in a portion of a page, the portion of a page from which data is sensed is determined based in part on offset information;
   loading the data that is stored;

manipulating the data so that the data is in a proper order in a register component based in part on the offset information and masking non-determinate bits of the manipulated data to a known value.

14. The method of claim 13, further comprising:

aligning the data, the aligning the data comprising at least one of shifting the data or rotating the data; and loading the data to facilitate comparison of the data with the data pattern.

15. The method of claim 14, further comprising:

loading the data pattern to facilitate comparison of the data pattern with the data;

comparing the data to the data pattern.

16. The method of claim 15, further comprising:

at least one of:

retrieving a page associated with the data if the data matches the data pattern, loading the page, indicating that a logical block address associated with the page is located, and providing the page; or searching for a logical block address in at least one other page in the at least one memory.

17. The method of claim 13, further comprising:

providing a first command to a first memory to facilitate a search for a first logical block address in the first memory;

providing at least one other command to at least one other memory to facilitate a search for at least one other logical block address in the at least one other memory;

locating a first page in the first memory that contains the first logical block address based in part on the first command;

locating at least one other page in the at least one other memory that contains the at least one other logical block address based in part on the at least one other command;

loading the first page;

loading the at least one other page;

indicating that the first page is ready to be transmitted;

indicating that the at least one other page is ready to be transmitted;

transmitting the first page; and transmitting the at least one other page.

18. The method of claim 17, further comprising:

performing the locating the first page and the locating the at least one other page in parallel.

19. The method of claim 13, further comprising:

terminating a search for a logical block address in the at least one memory based in part on a predetermined maximum number of searches specified in the command.

\* \* \* \* \*